US008612605B2

(12) United States Patent
McCoy et al.

(10) Patent No.: US 8,612,605 B2
(45) Date of Patent: Dec. 17, 2013

(54) COMMUNICATION OF SERVICE INFORMATION BY APPLIANCE COMPONENTS

(75) Inventors: Richard A. McCoy, Stevensville, MI (US); David M. Williams, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 990 days.

(21) Appl. No.: 12/345,769

(22) Filed: Dec. 30, 2008

(65) Prior Publication Data

US 2010/0169420 A1    Jul. 1, 2010

(51) Int. Cl.
*G06F 15/16* (2006.01)

(52) U.S. Cl.
USPC .......................................... 709/227; 709/224

(58) Field of Classification Search
USPC .................................................. 709/224, 227
See application file for complete search history.

(56) References Cited

U.S. PATENT DOCUMENTS

| | | | |
|---|---|---|---|
| 5,268,666 A | 12/1993 | Michel et al. | |
| 5,600,310 A * | 2/1997 | Whipple et al. | 340/3.51 |
| 5,875,430 A | 2/1999 | Koether | |
| 5,974,474 A * | 10/1999 | Furner et al. | 710/8 |
| 6,212,587 B1 * | 4/2001 | Emerson et al. | 710/107 |
| 6,671,748 B1 * | 12/2003 | Cole et al. | 710/8 |
| 6,820,039 B2 | 11/2004 | Johnson et al. | |
| 6,842,721 B2 | 1/2005 | Kim et al. | |
| 6,907,488 B1 * | 6/2005 | Diehl | 710/305 |
| 6,915,342 B1 | 7/2005 | Motoyama | |
| 6,963,784 B1 * | 11/2005 | Gibbs | 700/94 |
| 7,034,707 B2 * | 4/2006 | Aisa | 340/662 |
| 7,043,577 B2 * | 5/2006 | Hooker et al. | 710/105 |
| 7,099,649 B2 | 8/2006 | Patterson et al. | |
| 7,136,927 B2 | 11/2006 | Traversat et al. | |
| 7,171,475 B2 | 1/2007 | Weisman et al. | |
| 7,269,877 B2 | 9/2007 | Tondra et al. | |
| 7,296,099 B2 | 11/2007 | Davison | |
| 7,353,073 B2 | 4/2008 | Ferchau | |
| 2002/0082924 A1 | 6/2002 | Koether | |
| 2004/0098504 A1 * | 5/2004 | Ueno et al. | 709/238 |
| 2005/0251450 A1 | 11/2005 | Koether et al. | |
| 2006/0092861 A1 | 5/2006 | Corday et al. | |
| 2007/0021964 A1 | 1/2007 | Maenishi et al. | |
| 2007/0029812 A1 | 2/2007 | Monts de Oca | |
| 2007/0029813 A1 | 2/2007 | Eichenauer | |
| 2008/0238653 A1 | 10/2008 | Unger | |

FOREIGN PATENT DOCUMENTS

EP    1583027 A1    10/2005

OTHER PUBLICATIONS

Merriam-Webster, Dictionary defintion for the prefix "sub-", printed on Dec. 17, 2010, available at http://mw2.merriam-webster.com/dictionary/subcomponent. 1 pg.*

* cited by examiner

*Primary Examiner* — Patrice Winder
*Assistant Examiner* — Ebrahim Golabbakhsh

(57) ABSTRACT

An appliance has at least two components and an internal communications network. A first component is in communication with the network and the second component is not. But the first component is configured to communicate service information related to the second component over the internal communications network. The service information will include one or more identifiers.

19 Claims, 24 Drawing Sheets set appliance model number message — 140

| byte 0 | byte 1 | byte 2 | byte 3 | byte 4 | byte 5 | byte 6 | byte 7 | byte 8 | byte 9 | byte 10 |
|---|---|---|---|---|---|---|---|---|---|---|
| appliance model number length | appliance model number character 1 | appliance model number character 2 | appliance model number character 3 | appliance model number character 4 | appliance model number character 5 | appliance model number character 6 | appliance model number character 7 | appliance model number character 8 | appliance model number character 9 | appliance model number character 10 |

502 ⟶ {above} — 500

| byte 11 | byte 12 | byte 13 | byte 14 | byte 15 |
|---|---|---|---|---|
| appliance model number character 11 | appliance model number character 12 | appliance model number character 13 | appliance model number character 14 | appliance model number character 15 |

504

Fig. 4 publish appliance model number message — 142

| byte 0 | byte 1 | byte 2 | byte 3 | byte 4 | byte 5 | byte 6 | byte 7 | byte 8 | byte 9 | byte 10 |
|---|---|---|---|---|---|---|---|---|---|---|
| appliance model number length | appliance model number character 1 | appliance model number character 2 | appliance model number character 3 | appliance model number character 4 | appliance model number character 5 | appliance model number character 6 | appliance model number character 7 | appliance model number character 8 | appliance model number character 9 | appliance model number character 10 |

508 ⟶ {above} — 506

| byte 11 | byte 12 | byte 13 | byte 14 | byte 15 |
|---|---|---|---|---|
| appliance model number character 11 | appliance model number character 12 | appliance model number character 13 | appliance model number character 14 | appliance model number character 15 |

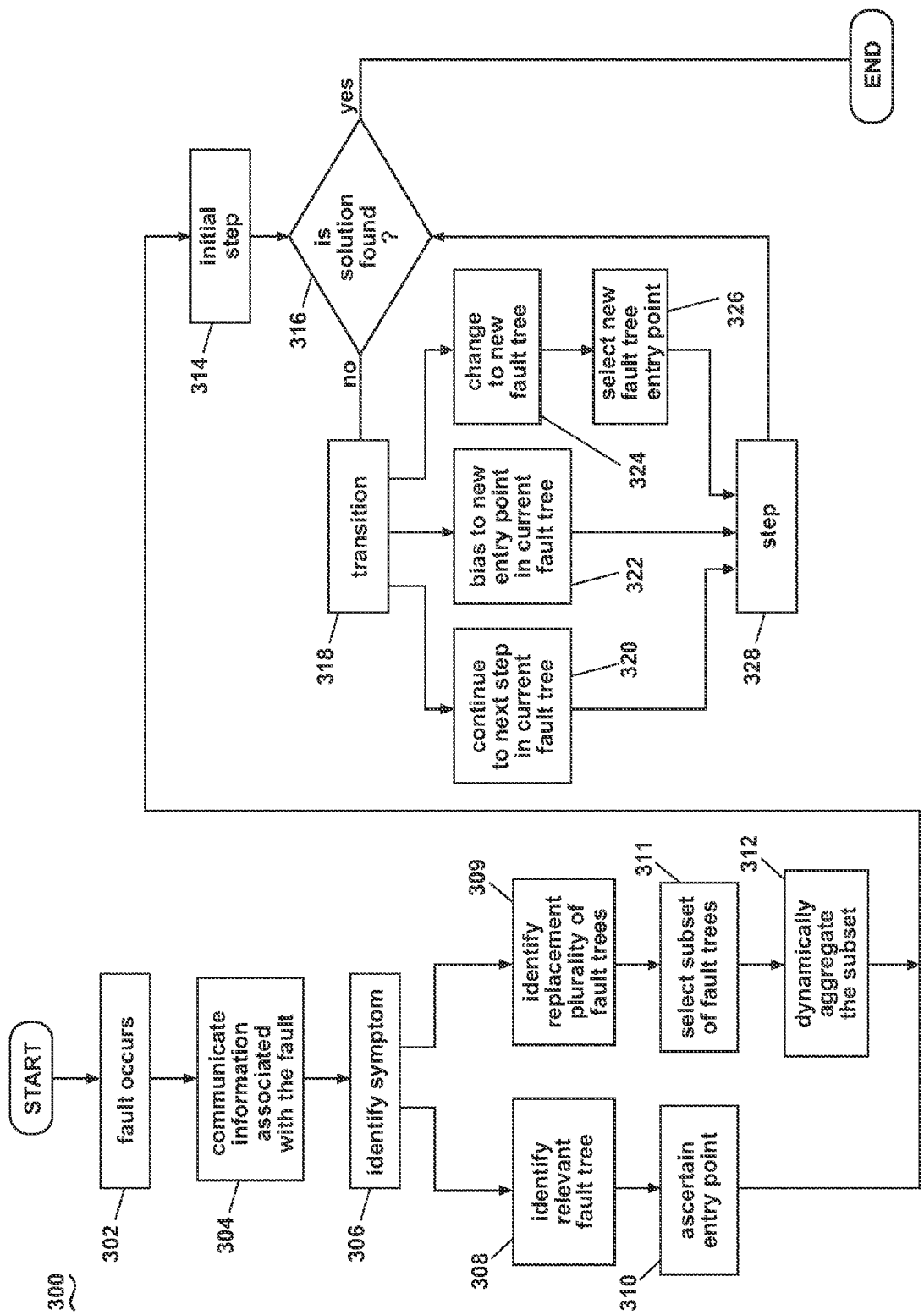

COMMUNICATION OF SERVICE INFORMATION BY APPLIANCE COMPONENTS

BACKGROUND OF THE INVENTION

The invention relates to of appliances and to identifiers that enable communication of service information about appliance components.

SUMMARY OF THE INVENTION

The invention lies in an appliance having at least two components and an internal communications network. A first component is in communication with the network and the second component is not. But the first component is configured to communicate service information related to the second component over the internal communications network. The service information will include one or more identifiers.

In one aspect, the first component is configured to communicate the number of second components for which it is configured to communicate service information. The first component can be responsive in subsequent messages to queries about each of the second components arising from a count loop based on the number. Preferably, the first component is responsive in further messages to queries based on an index correlating to the count loop. In this manner, the inquirer can obtain information about a second component knowing only an index parameter associated with the second component.

As well, the first component can be responsive in subsequent messages to queries about the number of subcomponents related to the second component. Further the first component can be responsive in subsequent messages to queries about each of the subcomponents arising from a second count loop based on the number. Preferably in this instance, the first will be responsive in further messages to queries based on a second index correlating to the second count loop. Thus, the inquirer can obtain information about a subcomponent knowing only an index parameter associated with the subcomponent.

In another aspect, the second component is a subcomponent of the first component, and the first component is responsive in subsequent messages to queries about each of the subcomponents arising from a count loop based on the number.

In any case, the first component is in a position to communicate the service information to a client. The service information can include serial number, model number, component information, manufacturer, supplier, location, cross reference, time of manufacture, date of manufacture, location of manufacture, a software module, a functionality identifier, replacement part, original part, and software module version, serial number, model number, part number, manufacturer, supplier, location, cross reference, time of manufacture, data of manufacture, place of manufacture, a software module, a functionality identifier, software version, attributes of a particular component, attributes of particular material used in a component, attributes of a component type, attributes of material type used in a component, information associating material or component with a 'lot' or batch, information associating material or components with time, a location, or cost, and replacement information.

The first component can communicate with the second component over a network other than the internal communications network of the appliance. As well, the service information related to the second component can actually be in the first component. The service information related to the second component can also be in memory accessed by the first component. Further, the second component can be virtual.

As a virtual component, it can be a first software module for controlling a motor, a data module containing data parameters about the motor allowing the first software module to appropriately parameterize and configure itself for the control of the motor, a cycle engine for controlling the cycle of operation of an appliance, a data module containing a cycle structure for use by the cycle engine to control the cycle of operation, a data module containing data for use by a user interface engine to create screens, screen content, and the navigation between screens, and/or a data module containing media content which can be used in communication with a user.

In another aspect, the first component can proxy for at least two other components and communicate the number of components for which it proxies. The number can be used in subsequent messages as an identifier.

BRIEF DESCRIPTION OF THE DRAWINGS

FIG. 4 schematically illustrates a set appliance model number message in a message architecture according to the invention.

FIG. 5 schematically illustrates a publish appliance model number message in a message architecture according to the invention.

FIG. 29 schematically illustrates a method of diagnosing and servicing an appliance according to the invention.

DESCRIPTION OF EMBODIMENTS OF THE INVENTION

Appliance Communications Network

Figure 1:
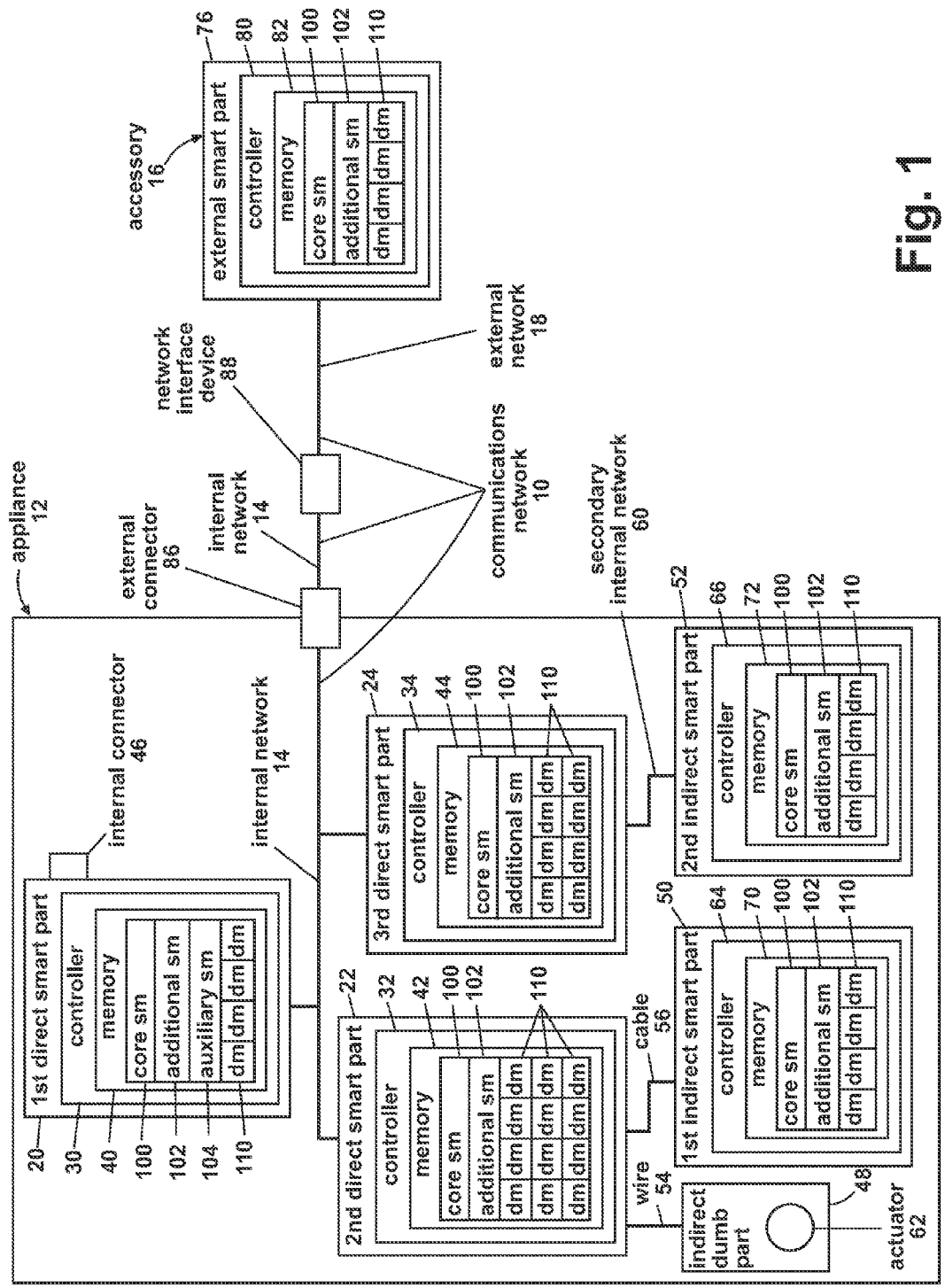
FIG. 1 is a schematic illustration of a system comprising an appliance and a communications network in which the invention is operable.

The environment of the invention includes a messaging protocol and a message architecture that are implemented on and used to communicate information over a communications network for an appliance. The contemplated communications network includes both an internal network within the appliance and an external network to which the internal network is connected. The messaging protocol and message architecture enable a type of universal communication approach allowing a component to query the communications network for and obtain comprehensive information about components associated with the appliance. As a result, the hardware and software of the appliance can be more easily traced, warranties associated with components and with the appliance can be more easily managed, and the appliance can be more easily and effectively serviced.

The appliance can be any suitable appliance, such as a household appliance. Examples of household appliances include, but are not limited to, clothes washing machines, clothes dryers, ovens, dishwashers, refrigerators, freezers, microwave ovens, trash compactors, and countertop appliances, such as waffle makers, toasters, blenders, mixers, food processors, coffee makers, and the like.

The appliance can be configured to perform a cycle of operation to complete a physical domestic operation on an article. Examples of the physical domestic operations include a food preparation operation, a food preservation operation, a fluid treatment operation, a cleaning operation, a personal care operation, a fabric treatment operation, an air treatment operation, and a hard surface treatment operation. The air treatment operation can comprise, for example, air purification, air humidification, air dehumidification, air heating, and air cooling. The food preparation operation can comprise, for example, food cleaning, food chopping, food mixing, food heating, food peeling, and food cooling. The food preservation operation can comprise, for example, food cooling, food freezing, and food storage in a specialized atmosphere. The fluid treatment operation can comprise, for example, fluid heating, fluid boiling, fluid cooling, fluid freezing, fluid mixing, fluid whipping, fluid dispensing, fluid filtering, and fluid separation. The cleaning operation can comprise, for example, dishwashing, fabric washing, fabric treatment, fabric drying, hard surface cleaning, hard surface treatment, hard surface drying, carpet cleaning, carpet treatment, and carpet drying. The personal care operation can comprise, for example, hair treatment, nail treatment, body massaging, teeth cleaning, body cleaning, and shaving.

As used herein, the term "component" refers to any single part or a combination of parts, such as those that participate in the operation of the appliance or are otherwise associated with the appliance, to which an identifier can be assigned. Additionally, as the appliance itself comprises a combination of parts, the appliance can also be considered a component. An identifier is related in some way to the part, combination of parts, or appliance to which it is assigned and provides meaning in a context specified by the messaging protocol and the message architecture. The appliance has one or more internal components internal to or comprising the appliance that participate in the operation of the appliance or that are otherwise associated with the appliance. One or more external components external to the appliance can also participate in the operation of the appliance or otherwise be associated with the appliance. At least one of the components or a combination of the components can be configured to implement and control a cycle comprising at least one operation.

Each component can include one or more physical parts and/or one or more virtual parts. Each physical part and each virtual part may also be considered a component, and each physical part and virtual part internal to the appliance would thus be considered internal components. In similar fashion, each physical part and each virtual part external to the appliance are external components.

A physical part can comprise one or more physical parts and may or may not also comprise one or more virtual parts. A virtual part can comprise one or more virtual parts. A part internal to the appliance that is part of a physical part directly connected to the internal network can be referred to as a direct part. A part internal to the appliance that is not part of a physical part directly connected to the internal network can be referred to as an indirect part. A part external to the appliance is called an external part. A part that is included in another part can be referred to as a subcomponent. For example, the rotor of a motor can be considered a subcomponent of the motor, and a subroutine of a program can be considered a subcomponent of the program.

An indirect part can be coupled to or associated with a direct part in a manner enabling the direct part to communicate messages according to the inventive messaging protocol and message architecture and containing information about the indirect part on the communications network. The direct part can obtain information about the indirect part in any of a variety of different manners, for example but not limited to via information automatically sent to the direct part by the indirect part, via a message containing information about the indirect part and communicated to the direct part, via information about the indirect part communicated by a user, via information about the indirect part prestored on the direct part, via information communicated by the indirect part to the direct part each time the direct part requests the information, via data accessible by the direct or the indirect part, or via data on the direct part that was stored on the direct part the first time that the indirect part communicated information to the direct part.

There are five exemplary types of messaging relationships between a direct part and an indirect part, although a direct part and an indirect part are not limited to having one of the five exemplary types of relationships.

In a first type of messaging relationship, if the direct part is connected to the indirect part by a network and the direct part includes routing capabilities, and if both the direct part and indirect part include the messaging protocol and message architecture enabling messaging between the direct part and indirect part according to the messaging protocol and message architecture, the direct part can route messages communicated on the communications network and associated with the indirect part to the indirect part, and, in some instances, the direct part can also route messages from the indirect part for communication on the communications network. The direct part can obtain information about the indirect part in any of the manners discussed previously.

In a second type of messaging relationship, both the direct part and indirect part include the messaging protocol and message architecture, and the direct part can blindly forward all messages communicated on the communications network to the indirect part. The direct part can obtain information about the indirect part in at least one of the manners discussed previously.

In a third type of messaging relationship, the direct part includes the messaging protocol and message architecture but the indirect part does not. In this type of relationship, the direct part can convert messages communicated on the communications network into an information format understandable by the indirect part and then send the formatted information to the indirect part. The direct part is able to obtain information in some form about the indirect part in at least one of the manners discussed previously.

In a fourth type of messaging relationship, the direct part comprises the messaging protocol and message architecture and can read information stored on the indirect part related to the indirect part in order to communicate messages containing information about the indirect part on the communications network. The direct part can either read the information about the indirect part each time it communicates a message containing information about the indirect part on the communications network, or the direct part can store the information about the indirect part on the direct part upon reading the information for the first time.

In a fifth type of relationship, the direct part comprises the messaging protocol and message architecture and the indirect part is completely unable to communicate any information with the direct part whatsoever. The direct part can be preset with stored information (e.g. contained in a virtual part) relating to the indirect part during the manufacture of the part or during the manufacture of the appliance containing the part, or the direct part can obtain information about the indirect part through communication with another component connected to the communications network, such as a database, or through communication with a user, such as via a user interface. Regardless of the method by which the information about the indirect part is obtained, the direct part can use the information to act as a proxy for the indirect part using the messaging protocol and message architecture. The proxying can comprise the direct part handling all communications related to the indirect part.

In other possible embodiments a communication network utilizing the invention and not described in detail herein, a first direct part may have a proxy-type relationship with a second direct part such that the first direct part acts as a proxy for the second direct part. This proxy-type relationship between the first direct part and second direct part can be formed in the event that the second direct part is unable to effectively, thoroughly, or completely communicate information across the communication network. Typically, the second direct part's inability to properly communicate information is caused by a problem within the second direct part, such as a lack of memory associated with the second direct part needed for communicating information, a problem with a particular version of software being used on the second direct part, or the like. Another reason for the second direct part's inability to properly communicate information is that a choice is made by the system designer to have the first direct part proxy for the second direct part so that the first direct part acts as a focal point for messaging with external components.

A physical part as defined herein can comprise one or more physical devices or objects, such as but not limited to a motor, a printed circuit board, a valve, a relay, a circuit, a keyboard, a keypad, a circuit, a fastener, a button, a power supply, a fan, a screen, an analog or digital I/O, a conduit, a cable, a monitor, a speaker, a heater, a connector, or an actuator. Physical parts typically include wiring, wiring harnesses, cables, circuits, or the like for communicatively coupling to a network and/or to other physical parts.

Some of the physical parts comprise a controller and are referred to herein as "smart parts." A controller can comprise a microprocessor mounted on a printed circuit board. The controller can be associated with at least one memory, which may or may not be physically included on the controller so long as the controller can access the memory. In one possible embodiment, the controller can be associated with a first memory physically included thereon. The controller can also be associated with a second memory physically included on a second controller and communicatively coupled to the first controller via the communications network 10. Some of the physical parts do not comprise a controller and are referred to herein as "dumb parts." A dumb part can be controlled by a controller associated with a smart part that is electrically or mechanically coupled to the dumb part. Typically, the smart parts cooperate to control the operation of all of the components in the appliance to implement an operation or cycle of operation for the appliance either directly or indirectly through other components.

For components comprising multiple parts, a controller associated with a smart part of the component can be used to control the other parts. If the component comprises multiple smart parts, the controllers associated with the multiple smart parts can cooperate to control the component. For example, a particular controller designated as a main or primary controller for the component can communicate and negotiate with other secondary controllers, which can be associated with different smart parts of the component, to control the component accordingly. This can be accomplished via a master-slave relationship between the primary controller and the secondary controller(s).

A virtual part as defined herein can comprise one or more non-physical devices or objects, such as but not limited to software and data. Virtual parts can be stored in a memory associated with at least one controller. For the purposes of describing the invention, virtual parts can be either software modules or data modules, which are portions of software and data, respectively. The portions of software forming each software module share a common purpose or functionality that can be associated with the software module. The portions of data forming each data module relate to the same identifier, information, attribute, part, appliance, or the like that can be associated with the data module.

As a non-limiting example, a software module can comprise a purpose, a functionality, system software, a program, an algorithm, a command or set of commands, a software architecture or portion thereof, a messaging protocol, a message architecture, a message generator, an instruction, an application, a driver, a translator, a diagnostic tool, a debugging tool, an operating system, a server, a utility, a database, a graphic user interface, a program, a procedure, an application, system software, testware, firmware, or middleware.

A data module can comprise any identifiers, information, attributes or other data associated with the appliance, with a particular part or group of parts, with the operation of the appliance or part, or otherwise associated with the appliance, part, or group of parts. As a non-limiting example, data modules can comprise identifiers, information, or attributes relating to parts and appliances associated with or comprising a name of a part, a name of an appliance, a name of a group of parts, a model number, a serial number, characteristics related to a model number, characteristics related to a serial number, a function, a message, a message element, a format of a data module, a format of an identifier, a format of a message element, an identifier indicative of whether an associated part is an original part or a replacement part, routing information, a source associated with an appliance, a source associated with a part, a manufacturer of a part or appliance (e.g. name or location), a supplier of a part or appliance of (e.g. name or location), a cross reference, a time of manufacture, a date of manufacture, a region, a business unit, a company, a schema, a control scheme, fault tree information, symptoms of various faults in a part or appliance, fault trees corresponding to various symptoms, fault tree entry points corresponding to various symptoms, priorities or severities of different symptoms, an error code, a fault code, diagnostic information, defect information, a defect function, recall information, replacement information, repair information, default settings, custom settings, user profiles, user input (e.g. settings, descriptions, notes, or other information input by a user), terms associated with user input, an event log, a usage history, a record, media (e.g. images, audio, or video), release information, database name or type (e.g. a manufacturer database, a service organization database, or a supplier database), database access information (e.g. a URL linked to a database, a database location, a database primary key, database content), media, a variable, a variable value, a parameter, a parameter value, an address, a link, a pointer, relationships or associations with other parts or appliances, a cycle of operation, information relating to a forking element, a material (i.e. a material used to construct a part or appliance), a class, an instance, a generation (e.g. a lot or batch of parts or appliance), a version, a cost or price, a manual, instructions, specifications, or a form.

Data modules can also associate various identifiers, information, and attributes with one another. For example, within a data module or multiple data modules, a particular material may be associated with a particular part or appliance, or with a particular generation of parts or appliances. In another example, a particular material, part, or appliance may be associated with a particular time, cost, or manufacturer, or with particular replacement information.

Each data module can be associated with one or more software modules. A data module can contain data of information used to form, parameterize, construct, arrange, control, operate, and use software modules. For example, a software module can be a cycle engine for effecting and/or controlling a cycle of operation of the appliance, and an associated data module can contain a cycle structure including operational instructions and parameters for use by the cycle engine to execute and control the cycle of operation of the appliance. In another example, a software module in the form of a user interface program for managing a display of the user interface can be associated with a data module containing data enabling the user interface program to control the display and creation of certain screens and screen content, the navigation between screens, and the presentation of media content. The media content can be used in communication with a user. In yet another example, a data module can comprise data parameters associated with a motor, and a software module of a motor controller can use the data module to appropriately parameterize and configure itself for the control of the motor. Additional examples of data modules for use by software modules include but are not limited to tuning constants of algorithms, machine parameters, user interface preferences, and builder instructions for software.

As illustrated in FIG. 1, an illustrative messaging protocol and message architecture can be implemented on and used to communicate information over a communications network 10 comprising an internal network 14 of an appliance 12 and an external network 18 connected to both the internal network 14 and to an accessory 16. The appliance 12 is configured to perform an operation on a physical article, such as clothing or food, using a resource such as water, temperature-controlled air (hot or cold), steam, gas, electricity, and the like. The resource is typically supplied to the appliance 12 by a resource conveyance (not shown), such as a conduit, wire, inlet, and the like. A plurality of internal components of the appliance can be communicatively coupled to one another by the internal network 14. One or more external components comprising the accessory 16 can be communicatively coupled to the internal network 14 via the external network 18. The internal network 14 and external network 18 can include any well-known interconnecting conduits, wiring and/or harnesses, or wireless systems suitable for interconnecting the internal components of the appliance 12 and for interconnecting the external components of the accessory 16, respectively, in a manner enabling the communication of messages across the communication network 10.

It will be apparent to one skilled in the art that the messaging protocol and message architecture described herein can be implemented and used on any suitable communications network 10, and that the illustrative example provided herein is simply one example of a suitable communications network 10. One example of an internal network 14 suitable for use in the appliance 12 is the WIDE network, created by Whirlpool, Inc. The external network 18 can be any type of network suitable for the purposes described herein. Types of networks include but are not limited to an RS-232 serial network, various forms of wireless networks (e.g. Zigbee or Wi-Fi), a USB connection-based network, or a wired Ethernet network.

The messaging protocol and message architecture expands the communication ability of the appliance 12 by effectively creating an open network such that external components on an external network 18, such as the accessory 16, can also use the messaging protocol and message architecture to communicate across the internal network 14 via a connection to the internal network 14.

The appliance 12 comprises a plurality of internal components including a first direct smart part 20, a second direct smart part 22, and a third direct smart part 24. The direct smart parts 20, 22, 24 can comprise any electronic, electrothermal, and/or electromechanical physical parts that collectively form each direct smart part 20, 22, 24. Direct smart part 20, for example, can comprise a user interface, a keypad, and a display for interacting with a user and receiving user input. Each of the direct smart parts 20, 22, 24 at least comprises a part or parts (not shown), such as electrical circuitry, one or more cables, a wiring harness, and/or a wireless connection, enabling the coupling of the various parts within each direct smart part 20, 22, 24 to one another and also enabling the communicative coupling of each direct smart part 20, 22, 24 to the internal network 14.

At least one of the direct smart parts 20, 22, 24 can communicate across the internal network 14 using the inventive messaging protocol and message architecture, which can be enabled or specified by a particular software module.

Each direct smart part 20, 22, 24 further comprises a controller 30, 32, 34, respectively, that is communicatively coupled to the internal network 14 in the manner discussed above. The controllers 30, 32, 34 can each comprise a conventional microprocessor on a printed circuit board. Each of the controllers 30, 32, 34 can include common parts, such as a memory 40, 42, 44, respectively, digital and/or analog inputs and/or outputs (not shown), and connections to various sensors and/or actuators (such as actuator 62) internal or external to the direct smart parts 20, 22, 24 for affecting various aspects of the operation of the direct smart parts 20, 22, 24, other parts, and/or the appliance 12. Optionally, the first direct smart part 20 can further comprise an internal connector 46 that can be configured to enable the coupling of the internal network 14 and the external network 18 as will be discussed in more detail hereinafter.

The appliance 12 further comprises an indirect dumb part 48, a first indirect smart part 50, and a second indirect smart part 52. The indirect dumb part 48 is electrically coupled to the second direct smart part 22 by a conventional wire 54. The first indirect smart part 50 is communicatively coupled to the second direct smart part 22 by a conventional cable 56. The communications network 10 can further comprise a secondary internal network 60 for communicatively coupling the second indirect smart part 52 of the appliance 12 to the third direct smart part 24. The secondary internal network 60 can be any well-known interconnecting conduit, wiring and/or harness, or wireless system suitable for communicatively coupling the second indirect smart part 52 and the third direct smart part 24. The secondary internal network 60 can be similar to the internal network 14.

The indirect dumb part 48 can comprise any electronic, electrothermal, electromechanical physical parts that collectively form the indirect dumb part 48, such as an actuator 62. However, the indirect dumb part 48 does not comprise a controller. The indirect dumb part 48 further comprises at least a part or parts (not shown), such as electrical circuitry or wiring, that electromechanically couples the actuator 62 to any other parts that may be present on the indirect smart part 48 and also to the wire 54. The wire 54 electromechanically connects the actuator 62 to the controller 32 of the second direct smart part 22.

The first indirect smart part 50 and second indirect smart part 52 are substantially similar to the direct smart parts 20, 22, 24 except that the indirect smart parts 50, 52 are not directly connected to the internal network 14. The indirect smart parts 50, 52 can comprise any electronic, electrothermal, and/or electromechanical physical parts that collectively form each indirect smart part 50, 52. Each of the indirect smart parts 50, 52 at least comprises a part or parts (not shown), such as electrical circuitry, one or more cables, a wiring harness, and/or a wireless connection, enabling the coupling of the various parts within each indirect smart part 50, 52 to one another and also enabling the communicative coupling of the indirect smart parts 50, 52 to the cable 56 and to the secondary internal network 60, respectively.

Each of the indirect smart parts 50, 52 further comprises a respective controller 64, 66 similar to the controllers 30, 32, 34. The controllers 64, 66 are communicatively coupled to the second direct smart part 22 and to the third direct smart part 24 in the manners discussed above. The controllers 64, 66 can each comprise a conventional microprocessor on a printed circuit board. Each of the controllers 64, 66 can include common parts, such as a memory 70, 72 respectively, digital and/or analog inputs and/or outputs (not shown), and connections to various sensors and/or actuators (such as actuator 62) internal or external to the indirect smart parts 50, 52 for affecting various aspects of the operation of the indirect smart parts 50, 52, other parts, and/or the appliance 12.

The accessory 16 can be communicatively coupled to the external network 18 and at the same time to the internal network 14 via the external network 18. The accessory 16 can be remote from the appliance 12. The accessory 16 can comprise one or more external components (not shown) contributing to the functionality of the accessory 16, such as a display, speakers, a touch screen, a scanner wand, or a mechanical part used for servicing and diagnostic purposes. Examples of accessories 16 for use with the invention include but are not limited to a personal computer, a device for uploading and/or editing new content for the appliance 12 such as a cycle of operation thereof, a media display, a monitor, a meter, a portable database, a source of information about a component on the communications network 10, a service device, a factory testing application, a diagnostic application, a field test application, an interface to a connected home environment, or a graphical user interface. The connection of the accessory 16 to the external network 18, whether adjacent to or remote from the appliance 12, enables value-added applications to communicate with the appliance 12. Some examples of value-added applications include but are not limited to an automated factory test, energy management applications, engineering development tools, appliance service and diagnostic tool, electronic controls manufacturing functional verification testing, consumer applications, and the like.

The accessory 16 comprises at least one external smart part 76. The external smart part 76 is substantially similar to the direct smart parts 20, 22, 24 except that the external smart part 76 is connected directly to the external network 18 and not the internal network 14. The external smart part 76 can comprise any electronic, electrothermal, and/or electromechanical physical parts that collectively form the external smart part 76. The external smart part 76 at least comprises a part or parts (not shown), such as electrical circuitry, one or more cables, a wiring harness, and/or a wireless connection, enabling the coupling of the various parts within the external smart part 76 to one another and also enabling the communicative coupling of the external smart part 76 to the external network 18.

The external smart part 76 further comprises a controller 80 similar to the controllers 30, 32, 34, 64, and 66. The controller 80 is communicatively coupled to the external network 18 in the manner discussed above. The controller 80 can comprise a conventional microprocessor on a printed circuit board. The controller 80 can include common parts, such as a memory 82, digital and/or analog inputs and/or outputs (not shown), and connections to various sensors and/or actuators (such as actuator 62) internal or external to the external smart part 76 for affecting various aspects of the operation of the external smart part 76, other parts, and/or the appliance 12.

The appliance 12 can further comprise the internal connector 46, an external connector 86, and a network interface device 88 or some combination thereof for communicatively coupling the internal network 14 to the external network 18 to enable the communication of information between at least one internal component of the appliance 12 and at least one external component of the accessory 16. The internal connector 46, the external connector 86, or both connectors 46, 86 can be included on the appliance 12. The particular embodiment of the communications network 10 shown in FIG. 1 includes both an internal connector 46 and an external connector 86 but employs the external connector 86. The connectors 46, 86 can comprise physical interfaces providing access and connection to the internal network 14. For example, the connectors 46, 86 can accommodate an extension of the internal network 14 externally of the appliance 12. In the embodiment illustrated in FIG. 1, the internal network 14 extends through the external connector 86 and communicatively couples to the network interface device 88, which is communicatively coupled to the external network 18. Typically, information will be communicated across the internal network 14, network interface device 88, and external network 18 between one or more direct smart parts 20, 22, 24 and the external smart part 76.

The connectors 46, 86 can comprise physical interfaces configured to provide access to the internal network 14 in a wired or wireless manner. For example, the connectors 46, 86 can comprise ports connected to the internal network 14 and configured to receive a wired or wireless component that effectively extends the internal network 14 somewhat externally from the appliance 12 for connection to the network interface device 88. Adapters (not shown) can be used with the connectors 46, 86 to provide connection to a variety of different types of networks and/or components.

The internal connector 46 is physically coupled to or physically part of an internal component of the appliance 12, such as the first direct smart part 20. The internal connector 46 can be physically connected to the part or parts within the first direct smart part 20 that couple the various parts within the first direct smart part 20 to the internal network 14, which will result in the indirect coupling of the internal connector 46 to the internal network 14 through the first direct smart part 20. The internal connector 46 can be accessed via the opening of a lid, a service door, or the like (not shown) included on the appliance 12. In other possible embodiments, the internal connector 46 can be physically coupled directly to the internal network 14.

The external connector 86 is similar in structure and function to the internal connector 46 but is accessible at an exterior of the appliance 12. The external connector 86 can be physically coupled directly to the internal network 14. In other possible embodiments, the external connector 86 can be physically coupled to or physically part of an internal component of the appliance 12 as long as the external connector 86 is still openly accessible at an exterior of the appliance 12.

The network interface device 88 is configured to communicatively couple the internal network 14 and the external network 18, which are different types of networks in the particular embodiment illustrated in FIG. 1. The network interface device 88 can incorporate bridging capabilities for enabling the transmission of messages between the internal network 14 and the external network 18. The network interface device 88 can further comprise additional functionalities, such as but not limited to message propagation and physical layer conversion capabilities.

A number of other possible arrangements of the internal network 14, connectors 46, 86, network interface device 88, and external network 18 of the communication network 10 that are different from the exemplary arrangement illustrated in FIG. 1 can also benefit from the messaging protocol and message architecture described herein. In a first possible arrangement, the network interface device 88 and external network 18 can be incorporated into the accessory 16, which can enable the internal network 14 to extend through the connector 46, 86 and connect directly to the accessory 16. In a second possible arrangement, the network interface device 88 can be incorporated into one or both of the connectors 46, 86, which can enable the external network 18 to couple directly to one of the connectors 46, 86.

The messaging protocol and message architecture described herein can be enabled and specified within a software architecture. The messaging protocol is a standard procedure for regulating transmission of messages having a structure corresponding to the message architecture between components connected to the communications network 10. The messaging protocol and message architecture can be implemented on and used to communicate information over the communications network 10 using the software architecture. The software architecture can be any suitable software architecture that can incorporate the inventive messaging protocol and message architecture so as to enable communication between at least two components connected to the communications network 10 according to the messaging protocol and message architecture. An example of suitable software architecture is disclosed in International Application No. PCT/US2006/022420, titled "SOFTWARE ARCHITECTURE SYSTEM AND METHOD FOR COMMUNICATION WITH, AND MANAGEMENT OF, AT LEAST ONE COMPONENT WITHIN A HOUSEHOLD APPLIANCE," filed Jun. 8, 2006, and published in document WO2006135726 on Dec. 21, 2006, the entire disclosure of which is incorporated herein by reference. All of the communications between components described in this application can be implemented by the software and network structures disclosed therein.

The software architecture can comprise a plurality of different software modules, each of which can have a different functionality. Various combinations of the software modules or all of the software modules can reside on each part. In the embodiment shown in FIG. 1, a core software module 100, an additional module 102, and an auxiliary module 104 together comprise the full software architecture and the full inventive messaging protocol and message architecture. The core software module 100 comprises a core software architecture including a core functionality of the messaging protocol and message architecture herein described that can be implemented on a component connected to the communications network 10 to expand the communication ability of the appliance 12. Typically, the core software module 100 resides on all of the direct smart parts 20, 22, 24. At least one of the direct smart parts 20, 22, 24 also includes one or more other software modules 102, 104 that, with the core software module 100, comprise a full software architecture fully capable of utilizing the messaging protocol and message architecture described below. The direct smart part 20, 22, 24 can function as an appliance controller. The additional software module 102 can comprise any number of functionalities contained within the software architecture. The auxiliary software module 104 can comprise a remaining portion of the software architecture not comprised by the core software module 100 or additional module 102. A plurality of data modules may or may not comprise data or information associated with each software module 100, 102, 104, the software architecture, or the inventive messaging protocol and message architecture.

In the embodiment shown in FIG. 1, each of the smart parts 20, 22, 24, 50, 52, 76 includes a respective memory 40, 42, 44, 70, 72, 82 configured to store one or more of the software modules 100, 102, 104 and/or one or more of a plurality of data modules 110. Typically, at least the direct smart parts 20, 22, 24 include at least the core software module 100 and as a result can form a node on the internal network 14 of the communications network 10 that can communicate with the other nodes on the communications network 10 and that functions as a client with respect to the other nodes. Similarly, those external components with at least the core software module 100 can form a node on the external network 18 of the communications network 10 that can communicate with the other nodes on the communications network 10 and that acts as a client with respect to the other nodes. In this specific example, each memory 40, 42, 44, 70, 72, 82 stores the core software module 100, an additional module 102, and one or more of a plurality of data modules 110.

The memory 40 associated with the first direct smart part 20 further includes the auxiliary software module 104. In combination with the core software module 100 and the additional software module 102 stored thereon, the auxiliary software module 104 comprises a software architecture configured to utilize the full messaging protocol and message architecture described below. The direct smart part 20 thus includes software modules 100, 102, 104 that enable both the full software architecture and the full messaging protocol and message architecture, thereby enabling the direct smart part 20 to function as a main or appliance controller. The appliance controller is configured to implement and control a cycle comprising at least one operation by governing the operation of the other internal components of the appliance 12. For example, in order to perform a drying cycle of operation, the appliance controller can send one or more messages containing operational parameters and instructions to the other internal components, and the other internal components can operate accordingly.

In the particular embodiment described herein, direct smart part 20 functions as the appliance controller and can comprise a user interface (not shown). In other possible embodiments, none of the internal components can singularly function as an appliance controller; rather, the internal components cooperate and negotiate parameters and instructions amongst themselves in order to control a cycle of operation of the appliance 12.

In other possible embodiments of the invention, the controllers 30, 32, 34, 64, 66, 82 of the smart parts 20, 22, 24, 50, 52, 76 can work together to control the operation of the appliance 12 without any one of the controllers 30, 32, 34, 64, 66, 82 functioning as a main controller. Regardless of the configuration, any smart part 20, 22, 24, 50, 52, 76 with the core software module 100 can function as a client with respect to the other smart parts 20, 22, 24, 50, 52, 76.

One or more of the controllers 30, 32, 34. 64, 66, 80 can be communicatively coupled to an additional memory, which can comprise any memory other than its associated memory 40, 42, 44, 70, 72, 82, respectively. The additional memory can be internal or external to the appliance 12. The additional memory can be the memory 40, 42, 44, 70, 72, 82 associated with another controller 30, 32, 34, 64, 66, 80, respectively. For example, one or more of the controllers 30, 32, 34, 64, 66, 80 can be configured for access to an additional memory located on or communicatively coupled to its respective smart part 20, 22, 24, 50, 52, 76.

As a second example of the use of an additional memory, the appliance 12 can include a port (not shown) communicatively coupled to one of the direct smart parts 20, 22, 24 or to the internal network 14 and configured to receive an auxiliary flash memory (not shown). In the event that a controller (not shown) does not include a memory thereon, the controller can still operate properly if provided access to a suitable memory in the manner described above.

In another possible embodiment of the invention, the core software module 100 may reside only on the memories 40, 42, 44 of the direct smart parts 20, 22, 24 and on the memory 82 of the external smart part 76. In this scenario, the second direct smart part 22 can function as a proxy and have a proxy-type relationship with the first indirect smart part 50. This proxy-type relationship between the second direct smart part 22 and the first indirect smart part 50 can be formed because the first indirect smart part 50 is not connected to the internal network 14 and is therefore unable to communicate information across the internal network 14. The first indirect smart 50 is instead connected to cable 56, which is connected to the second direct smart part 22 in the event that the first indirect smart part 50 is unable to effectively, thoroughly, or completely communicate information across the communication network 10 in an independent manner.

As illustrated in FIG. 1, the memory 40, 42, 44, 70, 72, 82 of each controller 30, 32, 34, 64, 66, 80, respectively, can be configured to store one or more software modules, one or more data modules, and various combinations thereof such as the core software module 100, additional modules 102, and data modules 110. The core software module 100 is typically stored on the respective memory 40, 42, 44, 70, 72, 82 of every controller 30, 32, 34, 64, 66, 80. In other possible embodiments, the core software module 100 may not be stored on all of the memories 40, 42, 44, 70, 72, 82 but is stored at least on one of the memories 40, 42, 44 on the first direct smart part 20, second direct smart part 22, and third direct smart part 24, respectively.

The messaging protocol establishes a convention for regulating message transmission among components connected to the communications network 10. The messaging protocol typically includes rules and associations, and also is predicated on the message architecture described herein. However, those components not having the core software architecture cannot communicate using the messaging protocol. A bridge can be used to communicatively couple components lacking the core software architecture to the communications network, if necessary. The bridge effectively translates the components' protocol into the inventive messaging protocol so that components without the core software architecture can communicate with other components on the communications network.

If a component on the communications network 10 is not enabled to communicate information over the communications network 10 using the messaging protocol and message architecture herein described, a bridge can be used to communicatively couple the component to the communications network 10. A messaging protocol is a standard procedure for regulating message transmission between components connected to the communications network 10; however, those components not having access to a portion of software architecture configured to enable communication using the messaging protocol and message architecture herein described cannot communicate in the described messaging protocol and message architecture. A bridge can be used to communicatively couple any components lacking the core software architecture to the communications network 10, if necessary. The bridge effectively translates the components' protocol into the messaging protocol herein described so that components without the core software architecture can communicate with other components on the communications network 10.

If a component on the communications network 10 is not enabled to communicate information over the communications network 10, the invention contemplates another means of obtaining information about the component, even if the component is not known on the network. Assume that a first component, such as one of the smart parts 20, 22, 24, is in communication with the network 10, and that a second component, such as the indirect dumb part 48, or one of the indirect smart parts 50, 52 is not. The first component is configured to communicate service information related to the second component over the internal communications network 10. The service information will include one or more identifiers, such as those described below in the message protocol and architecture. One or more of the software modules 100, 102, 104 may have or may be able to retrieve the service information. At a minimum, the software architecture is configured to set up a count loop responsive to queries received by the respective smart part.

Thus, for example, the smart part 22 is configured to communicate the number of other parts 48, 50 for which it is configured to communicate service information. The smart part 22 can be responsive in subsequent messages to queries about each of the other parts 48, 50 arising from a count loop based on the number communicated. The smart part 22 can be responsive in subsequent messages to queries based on an index correlating to the count loop. In this manner, the inquirer can obtain information about one of the other parts 48, 50 knowing only an index parameter associated with the part inquired about, even if the part is unknown. This facility is especially useful in diagnosing components of an appliance.

The same structure can be employed to communicate information about subcomponents related to the second component. In this case, the smart part 22 can be responsive in subsequent messages to queries about each of the subcomponents arising from a second count loop based on the number. In other words, nested count loops and associated indices will be enable full communication about all components and subcomponents in an appliance, whether known or not, so long as some smart part can communicate or proxy for them. Here, an inquirer can obtain information about a subcomponent knowing only an index parameter associated with the subcomponent. In other words, the smart part 22 can communicate the number of other parts for which it will respond. This enables the inquirer to set up a count loop and commence inquiries by iterating a loop corresponding to the number of parts and including the current count or index within the loop in the form of an identifier or part number corresponding to the indirect parts in the inquiries. In response to the inquiries, meaningful service information can be sent from the smart part 22 about the each of the indirect parts 48, 50, including the current count or index, which enables the inquirer to bind information about each of the indirect parts 48, 50 based on the current count or index. For example, the smart part 22 may respond to a first inquiry request for a physical part serial number for a part corresponding to a current count or index of 2 with a message including a physical part serial number of the indirect part 48 and an index of 2. Subsequently, the smart part 22 may respond to a second inquiry request for the number of virtual parts associated with an indirect part corresponding to the current count or index of 2 with a message including the current count or index of 2 and another value indicating the number of virtual parts on indirect part 48. In the case, the inquirer can assemble information from a plurality of messages about the an another part which is an unknown part with respect to the internal network 14 using the current count or index to relate information from plurality of messages to each part to which the message relates.

The same count loop technique can be applied to the situation where the second component is a subcomponent of the first component. The first component can be responsive in subsequent messages to queries about each of the subcomponents arising from a count loop based on the number.

In any case, the first component is in a position to communicate the service information to a client. The service information can be included in one or more data modules 110. The service information can include serial number, model number, component information, manufacturer, supplier, location, cross reference, time of manufacture, date of manufacture, location of manufacture, a software module, a functionality identifier, replacement part, original part, and software module version, serial number, model number, part number, manufacturer, supplier, location, cross reference, time of manufacture, data of manufacture, place of manufacture, a software module, a functionality identifier, software version, attributes of a particular component, attributes of particular material used in a component, attributes of a component type, attributes of material type used in a component, information associating material or component with a 'lot' or batch, information associating material or components with time, a location, or cost and replacement information, and/or any other information or data that can be included in a data module 110 as described previously herein.

The first component can communicate with the second component over a network other than the internal network 14 of the appliance. As well, the service information related to the second component can actually be included in the first component. The service information related to the second component can also be in a memory accessible by the first component.

If the component is a virtual part, relevant examples include a first software module for controlling a motor, a data module containing data parameters about the motor allowing the first software module to appropriately parameterize and configure itself for the control of the motor, a cycle engine for controlling the cycle of operation of an appliance, a data module containing a cycle structure for use by the cycle engine to control the cycle of operation, a data module containing data for use by a user interface engine to create screens, screen content, and the navigation between screens, and/or a data module containing media content which can be used in communication with a user.

In the exemplary embodiment illustrated in FIG. 1, all of the direct smart parts 20, 22, 24 can communicate messages across the internal network 14 using the messaging protocol and message architecture herein described. In other possible embodiments of the invention, as few as one of the direct smart parts 20, 22, 24 coupled to the internal network 14 can communicate messages across the internal network 14 using the messaging protocol and message architecture herein described and may act as a proxy for the remaining direct smart parts 20, 22, 24.

Figure 2:
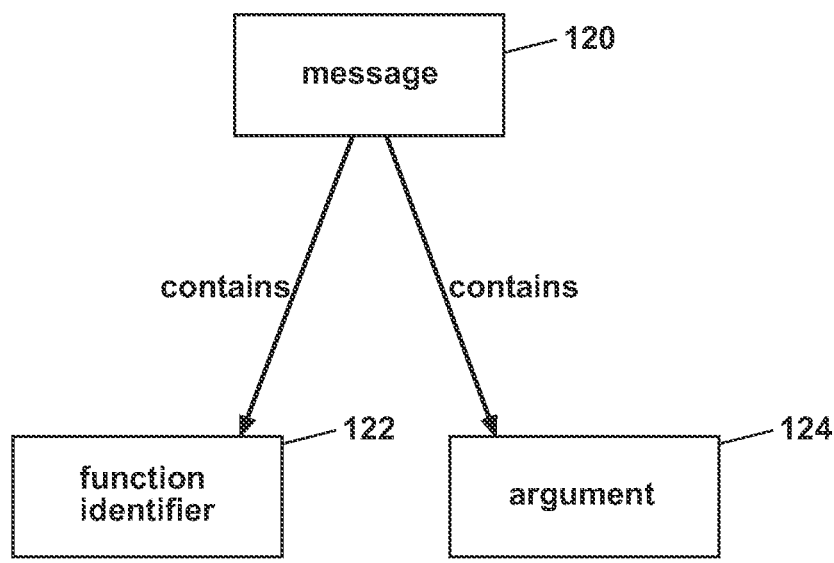
FIG. 2 is a schematic illustration of a message structure suitable for the communications network of FIG. 1.

Referring now to FIG. 2, the messaging protocol and message architecture herein described can be used to generate messages performing multiple functions. Those functions are identifiable by a message structure of an exemplary message 120 containing a function identifier 122 and an argument 124 for each identifier. For example, one function can relate to identifying each of the components, while another function can relate to identifying capabilities or functions of the identified components. Yet another exemplary function is to identify the status of the components. The arguments will typically include valid values associated with the respective function identifiers. In this way, the messaging protocol and message architecture can be used to inform all of the direct smart parts 20, 22, 24 on the internal network 14 and/or at least one indirect smart part 50, 52, and/or at least one external smart part 76 of the presence, capabilities, and status of other direct parts 20, 22, 24, indirect parts 48, 50, 52, and/or external parts. The arguments of messages not intended to convey information can include standard default, null, or void values. Any messages generated in accordance with the messaging protocol will have a structure generally similar to that of the exemplary message 120.

The messaging protocol and message architecture herein described enables the generation of at least one message used to communication information. A message generator for generating messages, such as message generator 130 shown in FIGS. 3, 10, and 18, can be any object capable of generating a message, such as a software module, a controller on a smart part, an accessory, or a component. One possible message generator is a user interface. The messages can be transmitted for bi-directional communication between smart parts. Messages can be broadcast to all nodes, such as the direct smart parts 20, 22, 24, external smart part 76, and/or any other part enabled to communicate over the communications network 10 or sent out a set number of times according to the number of nodes, such as by using the aforementioned count loop. A discovery process will typically occur prior to the transmission of messages according to the described messaging protocol and message architecture in order to discover the number of nodes on the communications network 10 and, potentially, additional information about the nodes.

Looking again at FIG. 1, the communicated information can include any number or combination of data modules 110, examples of which were discussed earlier. The data modules 110 in the memory of each direct smart part 22, 24 containing information about each indirect part 50, 52 connected thereto can be set during manufacture of the appliance or obtained from the indirect parts a first time they are needed and then saved for subsequent use. The obtaining the first time can be part of a discovery process. Alternatively, the data modules 110 containing information about each indirect smart 50, 52 part can be retrieved in real time each time a request, such as a get message (see below), is received by the direct smart part. In scenarios where a dumb part cannot communicate information, such data modules 110 can be set in the memory of the smart part serving as a proxy for the dumb part. In this particular example, information about the indirect dumb part 48 can be included in at least one data module 110 saved in the memory 42 of the direct smart part 22 or another smart part 20, 24, 50, 52 on the appliance network during manufacture of the appliance 12 because the indirect dumb part 48 is not enabled to communicate information. In other possible embodiments, data modules 110 including information about a dumb part can be obtained by a smart part connected thereto via accessing a byte on a digital circuit or a memory on the dumb part.

Messaging Protocol and Message Architecture

FIGS. 3-28A illustrate a messaging protocol and message architecture that facilitates communication between interconnected components/parts of the appliance 12 as well as with an external client or accessory 16, such as a diagnostic tool or an appliance servicer. In general, the message architecture comprises a first identifier which is essentially meta data to identify a second identifier within the message architecture. For example, the first identifier could be a value chosen from set of values which identifies a particular model number structure for an appliance model number that would comprise the second identifier. The message architecture is preferably flexible to comprise additional identifiers as needed. For example, a third identifier could be provided which cooperates with the second identifier (model number) to append a serial number identifier to the second identifier. If the second identifier comprises an appliance model number, and the third identifier comprises an appliance serial number, the cooperation of the first, second and third identifiers could identify a specific appliance within a universe of appliances manufactured by or for a specific manufacture. Further, the message architecture described herein is additionally flexible to provide for a fourth identifier which could identify additional information with respect to a specific manufactured appliance, such as in the example described herein, a fourth identifier could comprise manufacturer information which would identify which particular manufacturer and/or manufacturing location produced the particular appliance having the model number defined in the second identifier in the serial number defined in the third identifier. In one example, these four identifiers could uniquely identify each appliance ever manufactured. In a second example, the second, third, and forth identifiers could uniquely identify each appliance ever manufactured.

The messaging protocol and message architecture described herein preferably has identifiers which would assist a diagnostic tool or servicer to identify relevant information to service an appliance identified by the identifiers embedded within the message architecture. For example, information regarding the model number of the appliance, serial number of the appliance, manufacturer or manufacturing location of the appliance could all be relevant information to determine whether there are service notes, recalls or other information valuable to a diagnostic tool or servicer to assist in servicing and repairing an appliance. Information regarding the value of the message architecture described herein will be further described with respect to FIGS. 3-28A.

The messaging protocol and message architecture described herein also is preferably flexible to enable the determination of whether a particular component part, e.g., a circuit board, valve or other hardware component installed within the appliance, is an original equipment part or a replacement part. For example, within the message architecture is defined a "replacement part flag" that can be set to true at the manufacture of a part and that can then be set to false at the time the part is installed on or in a new appliance to signify that the part is an original part of the appliance. A user can then check this replacement part flag in the field to determine the status of the part. If the flag is false, then the part is considered an original part. If the flag is true, then the part is considered a replacement part and the diagnostic tool or servicer can take warranty issues into account if unauthorized repairs were made to the appliance between the time of manufacture and the time of servicing. Another way to determine whether a part is a replacement part, or, alternatively, whether a part is an unauthorized part, would be to assign universally unique identifiers (UUIDs) to each component of an appliance and to store the UUIDs in a data store for subsequent checks. Replacement or unauthorized parts could then be identified by a lack of a UUID or if an associated UUID is not present or authorized in the data store.

The messaging protocol and message architecture described herein is also preferably flexible to allow one part to query other interconnected parts to find identifiers for other parts connected thereto, functioning somewhat as a proxy within the messaging protocol and message architecture. For example, it will be described herein that the messaging protocol and message architecture includes methods for getting the number of hardware components (referred to herein as physical parts) and/or getting the number of projects or software modules (referred to herein as virtual parts). Each of the physical parts and/or virtual parts of an appliance 12 is treated identically, and both typically have part numbers, such as model numbers and serial numbers, within the appliance architecture. The messaging protocol and message architecture described herein include get/set requests and publish responses by which one virtual or physical part or a diagnostic tool can obtain information such as identifiers relating to the virtual and/or physical parts that are interconnected with a particular component and then iterate through each of those virtual or physical parts and obtain part information through the parent part.

The messaging protocol and message architecture described herein incorporates messages needed for service and diagnostics of appliances using basic information such as an appliance model number and serial number, information on appliance software modules (referred to herein as virtual parts), and information about physical parts or hardware installed within a particular appliance (referred herein sometimes as boards). It will be understood that the messaging protocol and message architecture described herein can be implemented in any number of ways with any number of physical and/or virtual parts, which would be apparent to one skilled in the art, and the particular networking or communication protocols need not be specifically described to be apparent to one implementing the inventions described herein. The physical parts that are installed within an appliance can have some physical parts connected to the internal network 14 or main bus within the appliance (e.g., direct smart parts 20, 22, 24 connected to the internal network 14) and have other "indirect" parts that are indirectly connected to the internal network 14 or main bus through other physical parts (e.g. indirect parts 48, 50, 52). The messaging protocol and message architecture described herein can obtain information iterating through the tree of interconnected physical and virtual parts items to obtain information and communicate that information back to the internal network 14 to respond to requests in any known manner. It will be understood that the virtual and/or physical parts do not need to be directly connected to the internal network 14 to be contemplated within the scope of this invention.

In connection with describing the message architecture, the terms "set", "get" and "publish" are used throughout this description. "Set" typically refers to a "request" type command in which a user or a virtual or physical part, such as a diagnostic tool in the exemplary form of accessory 16, makes a request to a particular component within the appliance 12 to set and/or store a particular value for a particular parameter of that component. "Get" also refers to any "request" type command in which a user or a virtual or physical part sends a request to a particular virtual or physical part to obtain information of value associated with a particular parameter for that component. "Publish" refers to a "response" type event in which the queried virtual or physical part replies to one of the set or get type commands with a response, typically showing either a confirmation of the set command and/or the particular queried information desired by the get command.

The message architecture described herein also contemplates various exception-type responses. Responses of exceptions for set commands can include an error that the component is unable to store the particular supplied data perhaps because non-volatile memory is not supported on that particular physical component. A reply exception could be provided for data already existing for that particular value from the set command if the particular data to be set has already been previously written, and a response message may throw this exception as either a warning or rejection that data is about to be overwritten. Other exceptions typically associated with a get command can include data not being found that was requested by the get command, in invalid identifier supplied by the get command, and/or in invalid physical or virtual part identifier. These exceptions are contained and contemplated within the message architecture to ensure that requests and responses are valid among the components within the appliance.

The various modules contemplated by the message architecture described herein are set forth below and with respect to FIGS. 3-28A. The various information that is queryable and that can be provided within the message architecture described herein are summarized below in Table 1, with a reference to which of FIGS. 3-28A have specific reference to the particular module. In some cases, a particular figure can be suitable for both "set" and "publish" commands and events, respectively, so a separate figure for each may not be necessary since the same architecture can be used for either.

TABLE 1

Summary of Message Architecture Modules

| Message Architecture Module | Figure(s) |
|---|---|
| Set Appliance Model Number | 3, 4 |
| Get Appliance Model Number | 3 |
| Publish Appliance Model Number | 3, 5 |
| Set Appliance Serial Number | 3, 6-7 |
| Get Appliance Serial Number | 3 |
| Publish Appliance Serial Number | 3, 8-9 |
| Get Number Of Physical Parts | 10, 11 |
| Publish Number Of Physical Parts | 10, 11 |
| Set Physical Part Model Number | 10, 12-13 |
| Set Physical Part Serial Number | 10, 14 |
| Get Physical Part Information | 10, 15 |
| Publish Physical Part Information | 10, 16-17 |
| Get Number Of Virtual Parts | 18, 19 |
| Publish Number Of Virtual Parts | 18, 20 |
| Get Virtual Part Name | 18, 21 |
| Publish Virtual Part Name | 18, 22 |
| Get Virtual Part Release Information | 18, 23 |
| Publish Virtual Part Release Information | 18, 24-25 |
| Get Virtual Part Version | 18, 26 |
| Publish Virtual Part Version | 18, 27 |
| Set Replacement Part Flag | 18, 28, 28A |

The description below refers to each command of Table 1, generally, with specific reference to a figure or figures, and with specific reference to one or more bytes making up the payload of the particular module discussed. It will be understood that a particular module can comprise a function, method, property or any other suitable hardware or software (i.e., physical or virtual part) executable item without departing from the scope of this invention and the particular language or protocol used to implement the message architecture described herein shall not be limiting on the scope of this invention as well.

Figure 3:
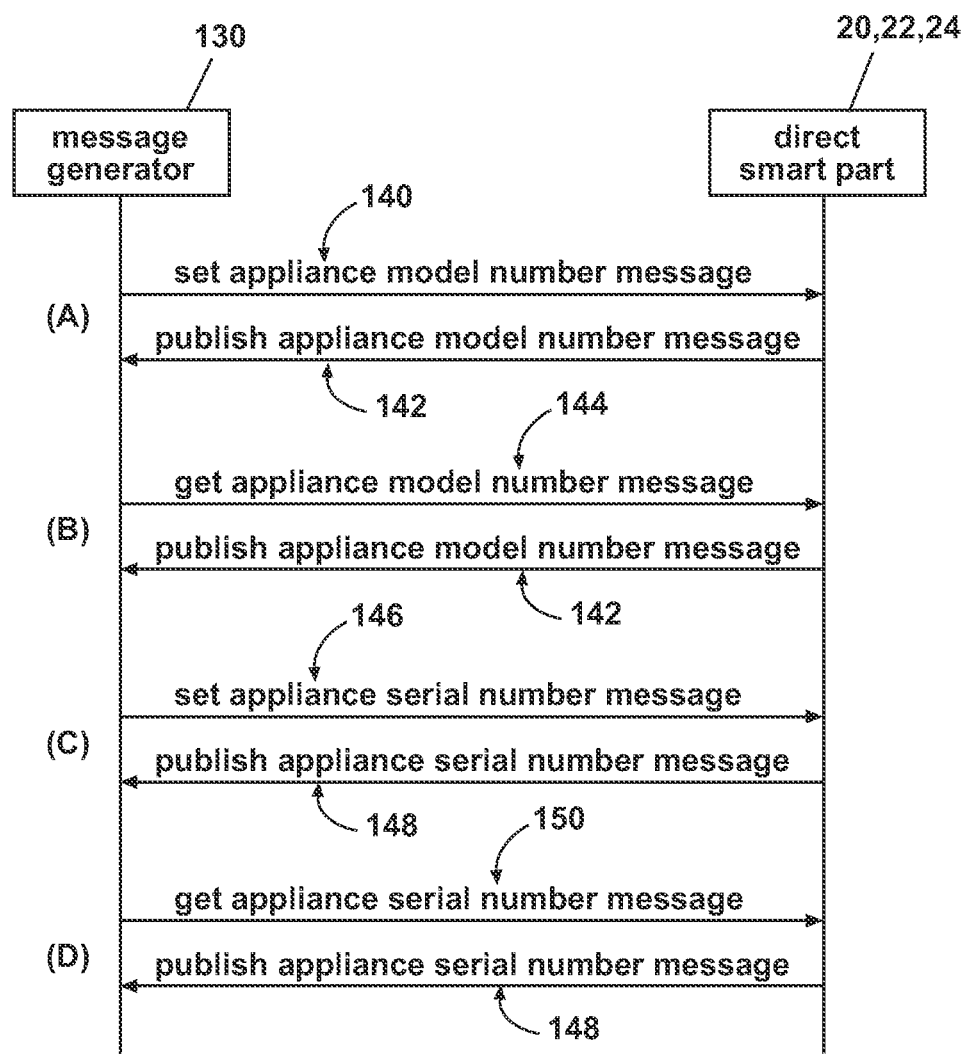
FIG. 3 schematically illustrates a series of messages between a message generator and a direct smart part in the communications network of FIG. 1.

Turning now to FIG. 3, the collaboration or exchange by message between a message generator 130 and direct smart part 20, 22, 24 are shown by example where A, B, C, and D correspond to typical message exchanges or request-response message pairs. It will be understood that additional or fewer commands can be provided between the message generator 130 and the smart part 20, 22, 24 without departing from the scope of this invention. Each of the exchanges shown in FIG. 3 is illustrated in either set-publish or get-publish pairs as will be apparent to one skilled in the art that, in each case, either a set or a get message issued by the message generator 130 is responded to by the smart part 20, 22, 24 by an appropriate publish event.

In the example shown in FIG. 3, a set appliance model number message 140 is responded to with a publish appliance model number message 142, a get appliance model number message 144 is responded to with a publish appliance model number message 142, a set appliance serial number message 146 is responded to with a publish appliance serial number message 148, and a get appliance serial number message 150 is replied to with a publish appliance serial number message 148. It will be noted that each of the get and set commands 140, 144, 146 and 150 are replied to with a similar publish message 142 and 148, respectively. Although these common publish responses 142 and 148 are shown by example, it will be understood that unique publish events can be provided for each of the messages without departing from the scope of this invention.

The various embodiments of the message architecture will now be described with respect to the byte maps of the payload for the messaging structures of FIGS. 4-9, 11-17 and 19-28. In each of these Figures, an example messaging structure according to the invention is shown, comprising a number of bytes, with each byte or series of bytes having a textual description associated therewith. It will be understood that the overall length of the particular byte maps, or the length in bytes of some described portion or subset of the bytes in each of FIGS. 4-9, 11-17 and 19-28 can be longer and/or shorter without departing from the scope of this invention.

Turning now to FIG. 4, a byte map 500 is shown corresponding to the set appliance model number message 140 as set forth in FIG. 3. The byte map 500 corresponding to this command includes a first identifier 502 and a second identifier 504. In the example byte map 500 shown in the illustration of FIG. 4, the first identifier 502 corresponds to byte zero in the byte map 500 and defines or identifies the form of the second identifier 504. The first identifier 502, comprising the appliance model number length identifier, then corresponds in bytes to the length of the second identifier 504. The second identifier 504 therefore comprises an appliance model number description made up of the number of bytes set forth in the first identifier 502.

The message 140 is used to store the appliance model number in persistent memory associated with a physical part such as a circuit board or controller that the message 140 is sent to. Message 140 can be sent to multiple physical parts within the appliance in order to have redundant copies provided thereon, for example, in case of a failure of one of the physical parts to which the message 140 was sent. The first identifier 502 allows for model numbers of varying lengths to be provided to a particular physical part. Therefore, all bytes making up the second identifier 504 (fifteen in the example shown in FIG. 4), may not be used if the first identifier 502, the appliance model number length, is less than the length of the second identifier 504, any post-pending bytes following the length of the second identifier 504 would simply be ignored. In the example shown in FIG. 3, a successful issuance of the set appliance model number message 140 shown in FIG. 4 would result in the queried physical part responding with the publish appliance model number message 142, an example of which is shown in FIG. 5. In addition, the publish appliance model number message 142 could also be provided by the queried physical part in response to a get appliance model number message 144 as set forth in FIG. 3. It will be understood that the appliance model number length identifier 502 can alternatively be an appliance model number type identifier or any other identifier used to uniquely identify the appliance or part.

Turning to FIG. 5, an example of the publish appliance model number message 142 is shown. Although by example, the message architecture for the publish appliance model number message 142 is the same as that set forth in the set appliance model number message 140 structure 500 shown in FIG. 4. As shown in FIG. 5, the byte map 506 is shown which, by the example shown in FIG. 5, comprises a first identifier 508 and a second identifier 510. The first identifier 508 corresponds to the length in bytes of the requested appliance model number and the second identifier 510 then corresponds to a series of bytes with the particular appliance model number carried thereon.

Figure 6:
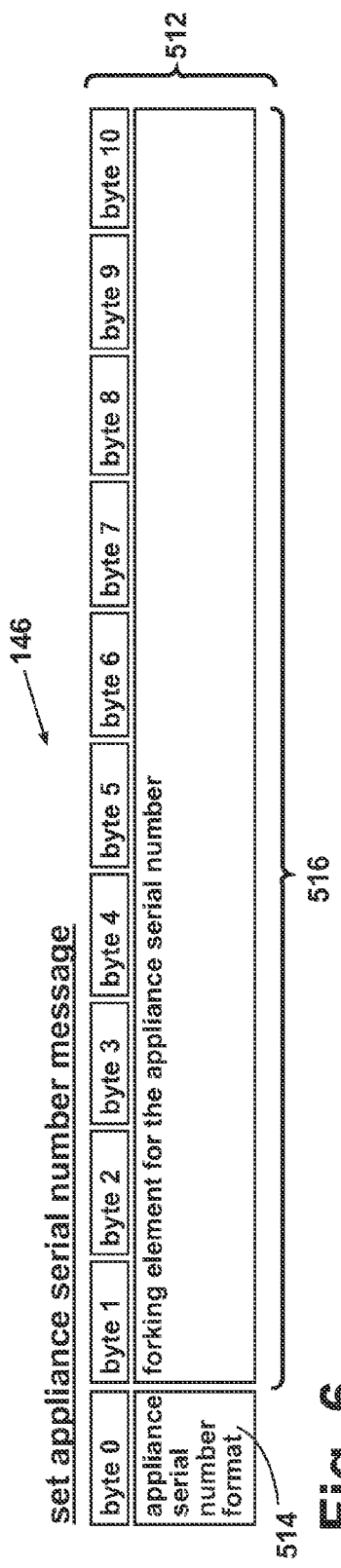
FIG. 6 schematically illustrates a set appliance serial number message in a message architecture according to the invention.

Turning to FIG. 6, a byte map 512, or portion thereof, is set forth in FIG. 6 which includes a first identifier 514 and a second identifier 516 which comprises a series of bytes which can be related to the content of the first identifier 514. In the example shown in FIG. 6, the first identifier 514 comprises an appliance serial number format which, in the example shown in FIG. 6, comprises a single byte having data which then causes the second identifier to "fork" or take on a meaning corresponding to the first identifier 514. These various forks are shown by the four potential byte maps 516 for the appliance serial number contained within the payload of the second identifier 516 shown in FIG. 7.

Figure 7:
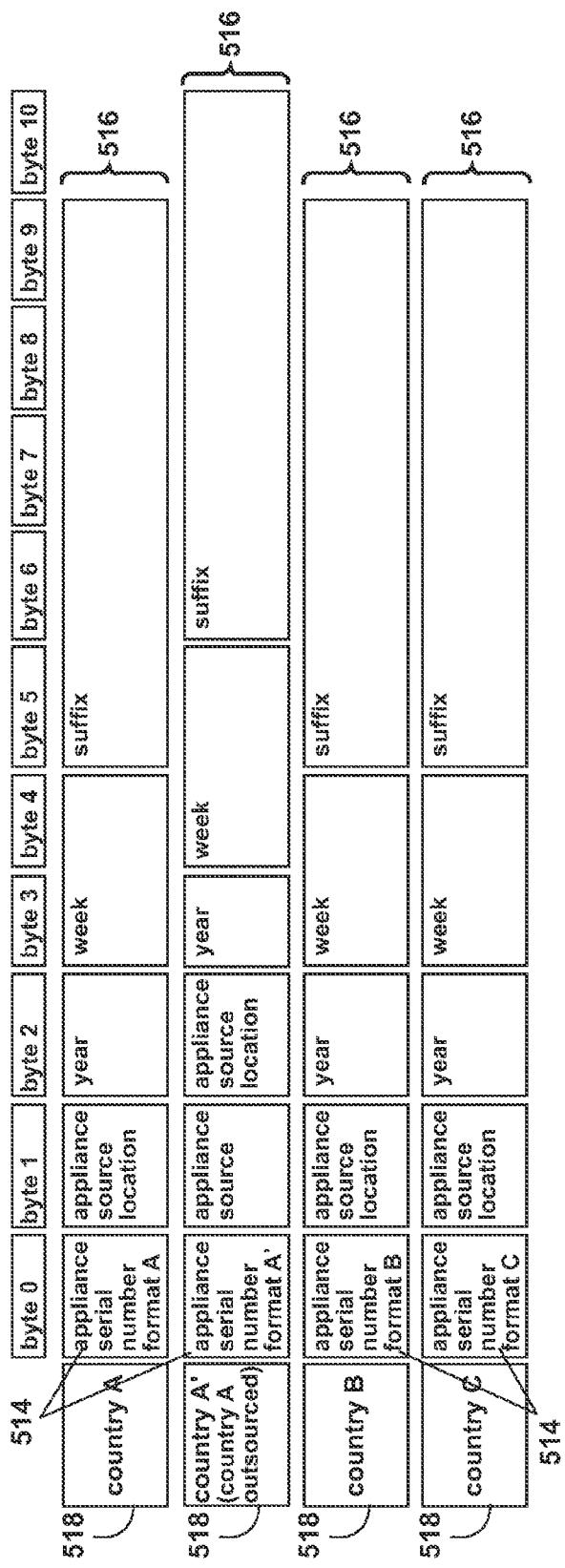
FIG. 7 schematically illustrates an exemplary forking element in the second identifier of FIG. 6.

Further referring to FIG. 7, the specific format of forking element 516 is selected from, in this example, four possibilities, each shown as 516 and beginning at byte 1. Byte 0 relates to the first identifier 514 whose value 518 determines which of the formats of the forking element 516 will be used in the message definition. In summary, in this example, the value of byte 0 is selected from four possible values 518, and the meaning of the remaining bytes 516 beginning at byte 1 is determined by the value of byte 0.

An example of the variations permitted by the message architecture example shown in FIG. 6 with the set appliance serial number message 146 is shown in FIG. 7. FIG. 7 contains a 10-byte example payload for four different examples of the conditional data carried by the second identifier 516 based on the content of the first identifier 514.

In the example shown in FIG. 7, four different country-related serial number formats are shown and it is contemplated that the message architecture shown in the example of FIG. 6 can conditionally relate each of the four different serial number formats shown in the second identifier 516 based upon the content of the first identifier 514 for these different countries: Country A, Country A' (Country A Outsourced), Country B and Country C. The countries are referred to generally with reference numeral 518.

As can be seen from reviewing the example of FIG. 7, depending upon the value 518 corresponding to the serial number format for either Country A, Country A', Country B or Country C in the first identifier 514, the payload for the second identifier 516 can have various series of bytes containing different information and the networking protocol will understand that a serial number will be provided in a certain format with respect to the second identifier 516 depending upon the value 518 of the first identifier 514.

For example, in the illustrative example shown in FIG. 7, byte 0 contains a value 518 of the first identifier 514 relating to a particular serial number format, and the remainder of the ten bytes beginning at byte 1 shown in FIG. 7 contain the second identifier 516 having a value of the serial number corresponding to the format prescribed by the format identifier which is the first identifier 514 having a value 518 selected from values corresponding to Country A, Country A', Country B and Country C. The different information can be provided in different bytes depending upon the value 518 of the first identifier 514. In the example shown in FIG. 7, the serial number formats for countries A, B, and C all have a common serial number format but the serial number format for Country A' is slightly different in that byte one contains an appliance source code which shifts by one byte its containing information relating to appliance source location, year, week and a suffix to the right making the appliance or number format for Country A' ten bytes long when the serial number formats for Countries A, B, and C are nine bytes long according to the example shown in FIG. 7. It will be understood that all of the individual message elements in each forking element combine to comprise the appliance serial number. Further the number of possible formats identifiable or usable for each forking element is defined by the number of bytes of the format type identifier and depends on the number of bytes used for the identifier. In the example since the serial number format 514 uses only one byte, there can be up to 255 formats.

Figure 8:
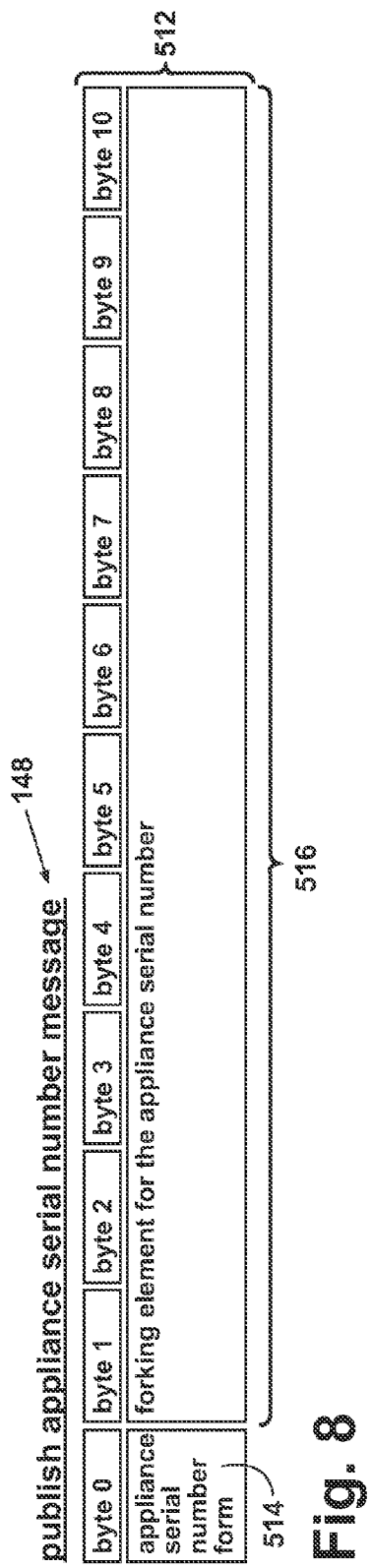
FIG. 8 schematically illustrates a publish appliance serial number message in a message architecture according to the invention.
Figure 9:
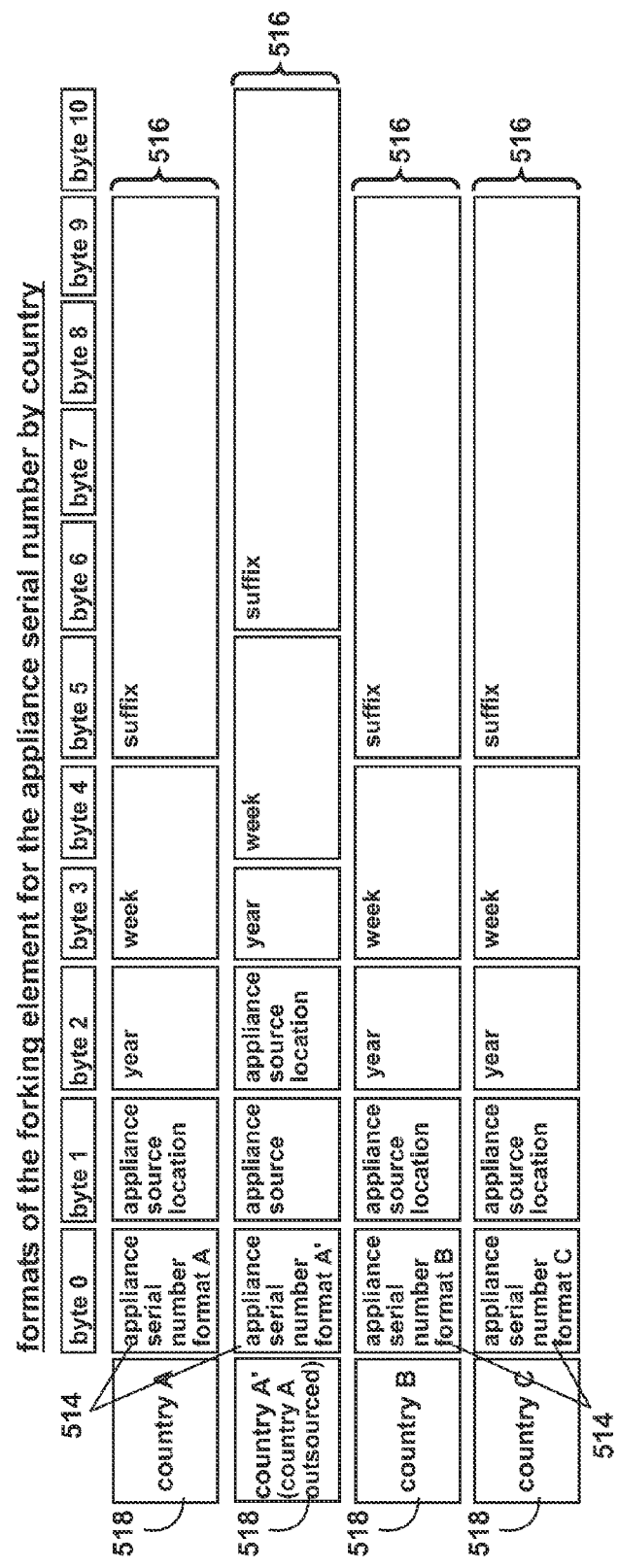
FIG. 9 schematically illustrates an exemplary forking element in the second identifier of FIG. 8.

Referring now to FIGS. 8-9, an example byte map is shown for the message structure for the publish appliance serial number message 148 as was discussed with respect to FIG. 3. In addition, various examples of a forking element for the appliance serial number are shown in FIG. 9 with a common example which was previously discussed with respect to FIG. 7. In the examples shown in FIGS. 8-9, the byte map of FIGS. 8-9 has a common structure with respect to that shown with respect to the set appliance serial number message 146 and, therefore, like elements are referred to with common reference numbers between FIGS. 6-7 and FIGS. 8-9.

Of course, it will be apparent to one skilled in the art that a differing-size or -format second identifier 516 based upon data contained in the first identifier 514 could be employed without departing from the scope of the invention. The byte map shown in FIGS. 6-9 are used to set, store and retrieve the appliance serial number in or from the persistent memory of a particular physical part, such as circuit board or controller, to which the message 146 or 148 is sent to, received from, or associated with. This message can also be sent to multiple controllers on the communications network 10 in order to have redundant copies stored in particular controller so that, in the case of a failure of one controller, the data regarding the appliance serial number is saved on other controllers on the network.

The flexible byte/payload arrangement between the first identifier 514 and the second identifier 516 are, in the example shown in FIGS. 7 and 9, for various country arrangements 518. The message architecture is flexible and can allow for accommodation of various serial number strategies based upon regional locations, manufacturing locations and the like. This flexible messaging format allows a serial number in format not to be required to rely on a global standard and can simply fill the second identifier 516 with the serial number of the length corresponding to the data carried by the first identifier 514. The first identifier 514 can be considered an enumerator which can select any of the number of serial number formats to accommodate for variations within an organization's or a regional entity serial number and formats.

Figure 10:
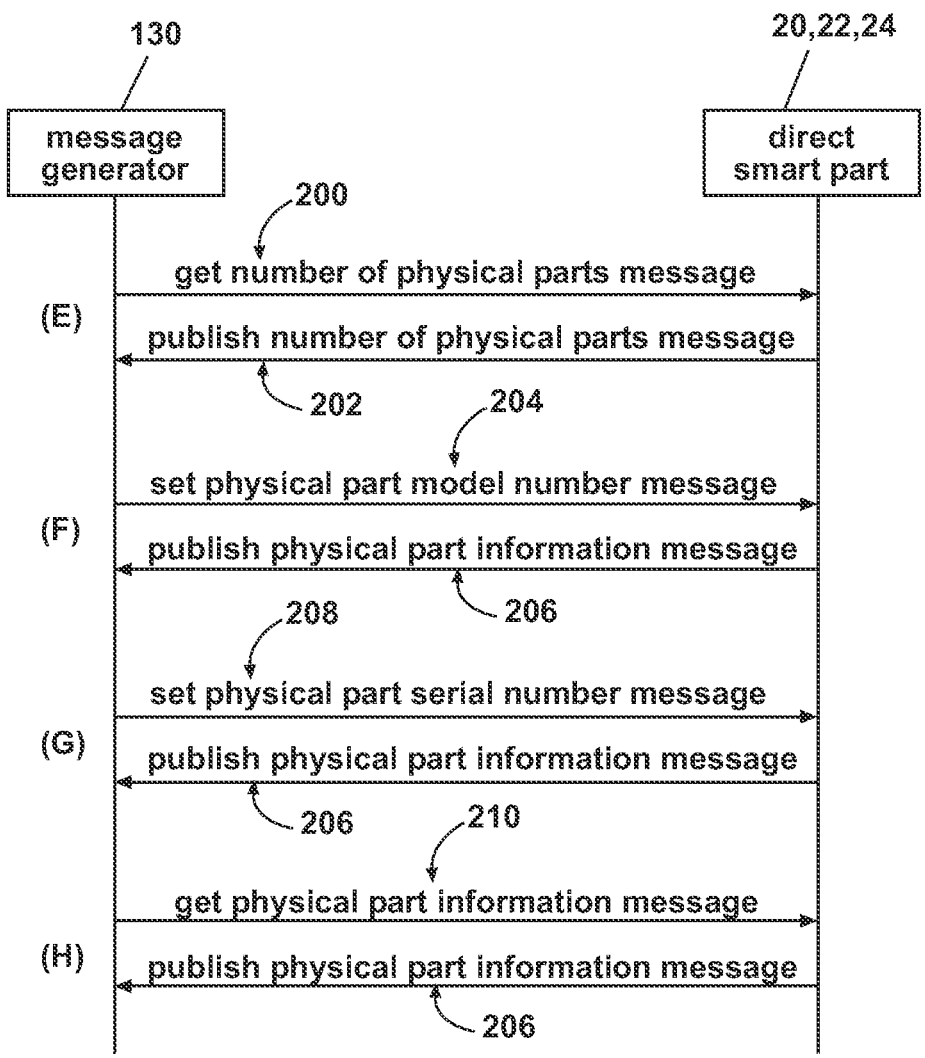
FIG. 10 schematically illustrates a series of messages between a message generator and a direct smart part in a manner similar to that of FIG. 3.

Turning now to FIG. 10, the collaboration or exchange by message between message generator 130 and direct smart part 20, 22, 24 are shown by example where E, F, G and H correspond to typical message exchanges or request-response message pairs. It will be understood that additional or fewer commands can be provided between the message generator 130 and the smart part 20, 22, 24 without departing from the scope of this invention. The description of the operation of the message architecture set forth in FIG. 10 is generally the same as that described with respect to FIG. 3 and a commensurate description is not provided again here. In the example shown in FIG. 10, a get number of physical parts message 200 is responded to with a publish number of physical parts message 202, set physical part model number message 204 is responded to with a publish physical part model number message 206, a set physical part serial model number message 208 is responded to with a publish physical part serial model number message 206, and a get physical part information message 210 is replied to with a publish physical part information message 206. It will be noted that, like with the description provided with FIG. 3, each of the get and set commands 200, 204, 208 and 210 are replied to with a similar publish message 202 and 206, respectively. Although these common publish responses 202 and 206 are shown by example, it will be understood that unique publish events can be provided for each of the messages without departing from the scope of this invention.

Figure 11:
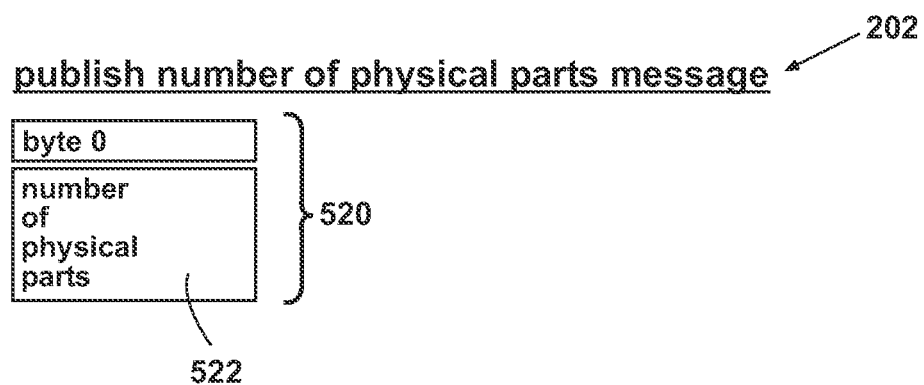
FIG. 11 schematically illustrates a publish number of physical parts message in a message architecture according to the invention.

Turning now to FIG. 11, an example of a byte map 524 of the publish number of physical parts message 202 as described with respect to FIG. 10 is shown. The byte map 520 comprises a single identifier, and the example shown in FIG. 11, referred to with reference numeral 522 which contains simply the number of physical parts associated with the direct smart part that is sending message 202 in response to message 200. In one example, a circuit board 22 to which the message 202 is sent would respond with 3 wherein the 3 includes 22, 48, and 50. In accordance with the invention, and as described with respect to FIG. 10, the publish number of physical parts message 202 is an event which is issued as a response to the get number of physical parts message 200 described with respect to FIG. 10.

The get number of physical parts message 200 allows nodes or direct smart parts connected to internal network 14 to report information for other physical parts not connected directly to internal network 14 but connected indirectly via a direct or indirect connection to one of the nodes/direct smart parts. Typically, the return value for the get number of physical parts message 200 can be "1" which indicates that the particular smart part being queried is only reporting its own controller/part data. However, it is possible, through other direct or indirect network connections other than the network on which these messages are sent, i.e., the internal network 14, that a smart part/node could essentially act as a proxy for other physical parts to which it is connected. In this case, the number provided by the publish number of physical parts message 202 will be greater than "1" and will correspond to the current node/smart part being queried as well as all of the other physical parts connected thereto. For example, referring to FIG. 1, smart part 22 would return the value "3", and smart part 24 might return the value "2" to a publish number of physical parts message as shown in FIG. 11.

Figure 12:
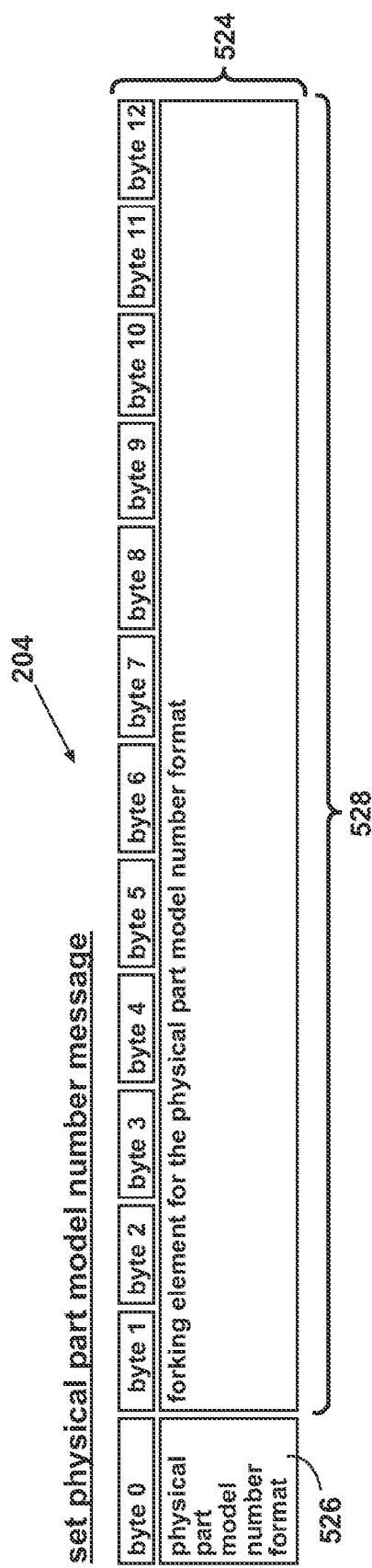
FIG. 12 schematically illustrates a set physical part model number message in a message architecture according to the invention.

Turning to FIG. 12, a byte map 524 for the set physical part model number message 204 discussed with respect to FIG. 10 is shown comprising a first identifier 526 and a second identifier 528. In the example shown in FIG. 12, the first identifier 526 comprises only location byte zero which comprises a physical part model number format which then defines an enumerator to define the payload for the second identifier 528. The second identifier 528 is described in FIG. 12 is a forking element for the physical part model number format which could be any number of physical part model number formats depending upon the data provided with respect to the first identifier 526. An example of the forking element for the physical part model number format comprising the second identifier 528 in FIG. 12 is shown with respect to FIG. 13.

Figure 13:
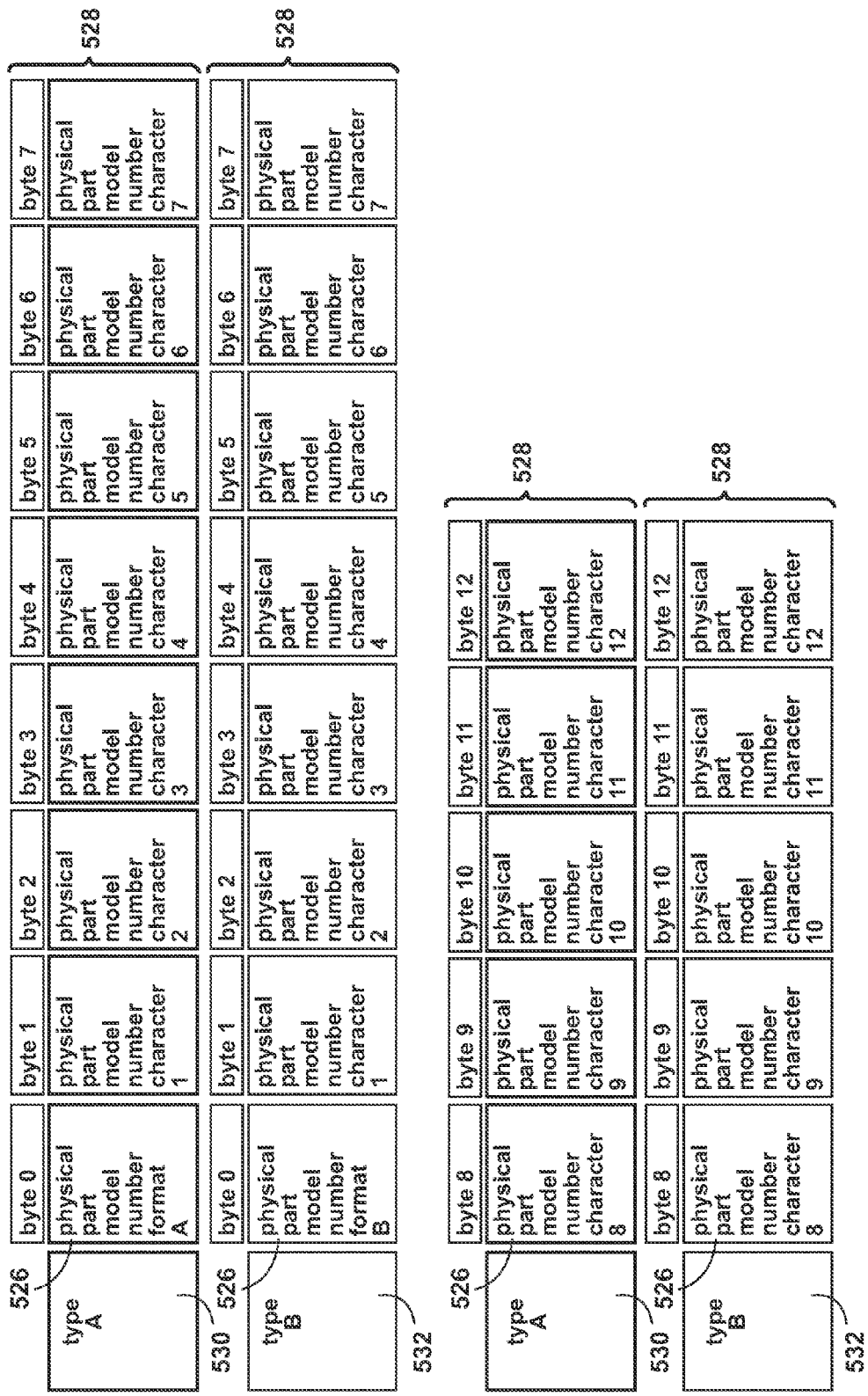
FIG. 13 schematically illustrates exemplary forking elements in the second identifier of FIG. 12.

FIG. 13 shows various embodiments of the second identifier 528 of the byte map 524 discussed with respect to FIG. 12. In the example shown in FIG. 13, two different physical part model number formats are shown which are referred to with an identifier to the left of byte zero for each of the second identifiers 528 as type A and type B and referred to with reference numerals 530 and 532, respectively.

While each of the physical part model number formats are shown as comprising twelve bytes, it will be understood that additional or fewer bytes could make up the payload for the second identifier 528 based upon the data contained in the physical part model number format identifier shown as the first identifier 526 in the byte map 524 in the example shown in FIG. 13. It will be understood that additional physical part model number formats can be provided of varying lengths by simply defining additional enumerators for the physical part model number format first identifier 526 for the byte map 524 in the example shown in FIG. 13. Moreover, the construction and content of the second identifier 528 may vary to accommodate various part types, various part suppliers, and various part functionalities.

Figure 14:
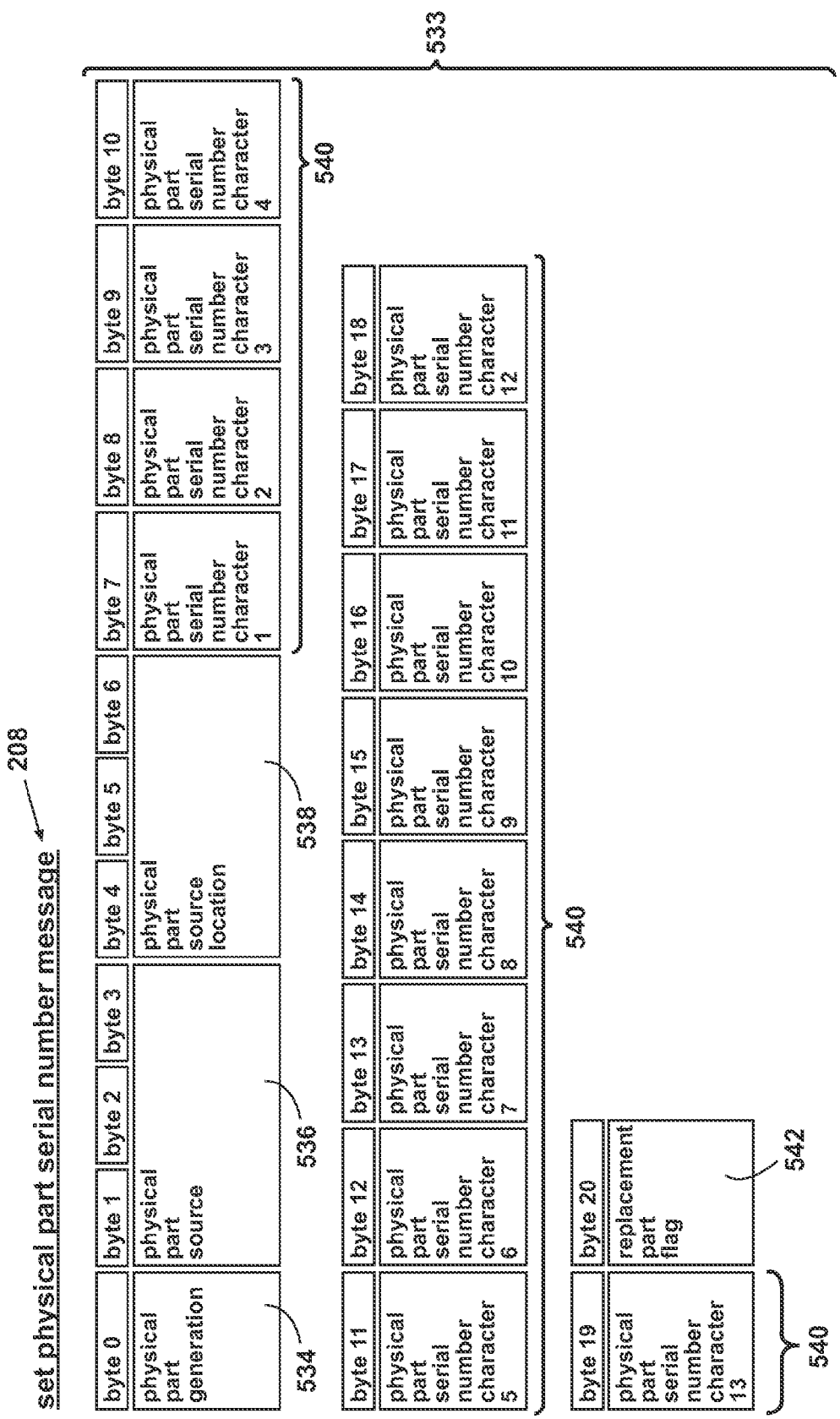
FIG. 14 schematically illustrates a set physical part serial number message in a message architecture according to the invention.

The set physical part model number message 204 with the example byte map 524 shown in FIG. 12 is used to store data such as the part model number on the persistent memory of a physical part, such as a circuit board or controller. Turning to FIG. 14, an example byte map 533 relating to the set physical part serial number message 208 for setting particular data regarding a physical part serial number and additional part information is shown by example. In the example shown in FIG. 14, a first identifier 534 is provided which defines a revision code for the particular physical part. In addition to the revision identifier shown in shown by reference 534, the byte map 533 shown in FIG. 14 can also have information comprising one or more bytes relating to a physical part source 536 (e.g. a manufacturer), a physical part source location 538, and one or more bytes comprising a physical part serial number shown by an additional identifier 540 which extends thirteen bytes in the example shown in FIG. 14.

At the end of the byte map 533 shown in FIG. 14 is a replacement part flag 542 which is preferably a Boolean variable which, when true, indicates that the physical part to which the set physical part serial number message 204 is sent is indeed a replacement part and, when false, the replacement part flag 542 indicates that the part was installed on the appliance at the time of manufacturing the appliance as original equipment (often referred to as OEM).

It will be understood that the set physical part model number message 204 will typically be transmitted by a message generator 130 associated with a manufacturer of the appliance 12, while the set physical part serial number message 208 will typically be transmitted by a message generator 130 associated with a manufacturer of the physical part at a different time and/or location than the set physical part model number message 204 is transmitted. This enables both the manufacturer of the part and the manufacturer of the appliance to associate information with the part separately. One benefit of this is that the manufacturer of the physical part can associate information with the physical part that corresponds to information in a database associated with the manufacturer of the physical part, while the manufacturer of the appliance can associate information with the physical part that corresponds to information in a database associated with the manufacturer of the appliance.

Figure 15:
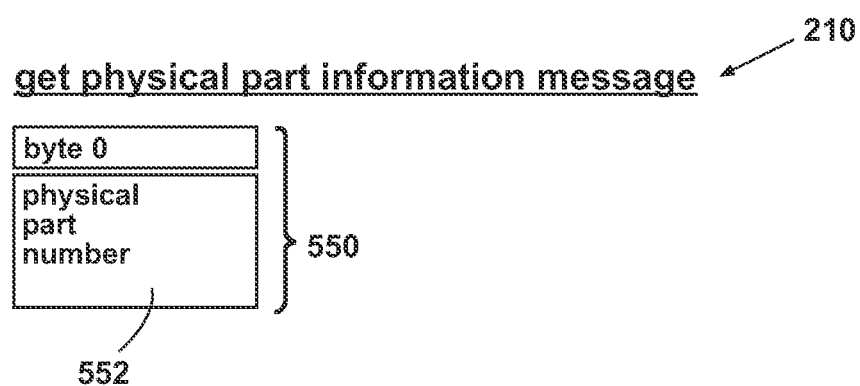
FIG. 15 schematically illustrates a get physical part information message in a message architecture according to the invention.

The byte maps 524 and 533, shown with respect to FIGS. 12-14, can be used to exchange by message the aforementioned information/data such as a physical part model number and a serial number on a physical part that can be retrieved at the same time by a get physical part information message 210 as discussed with respect to FIG. 10. An example byte map 550 is shown in FIG. 15 embodies the get physical part information message 210. Get physical part information message 210 is sent for each physical part from 1 to i, where "i" is the number returned in the publish number of physical parts message 200 described with respect to FIG. 10 and FIG. 11. Physical part number 552 is the index or current value of the loop count corresponding to the physical part from 1 to i. Get physical part information message 210 results in a publish physical part information message 206.

Figure 16:
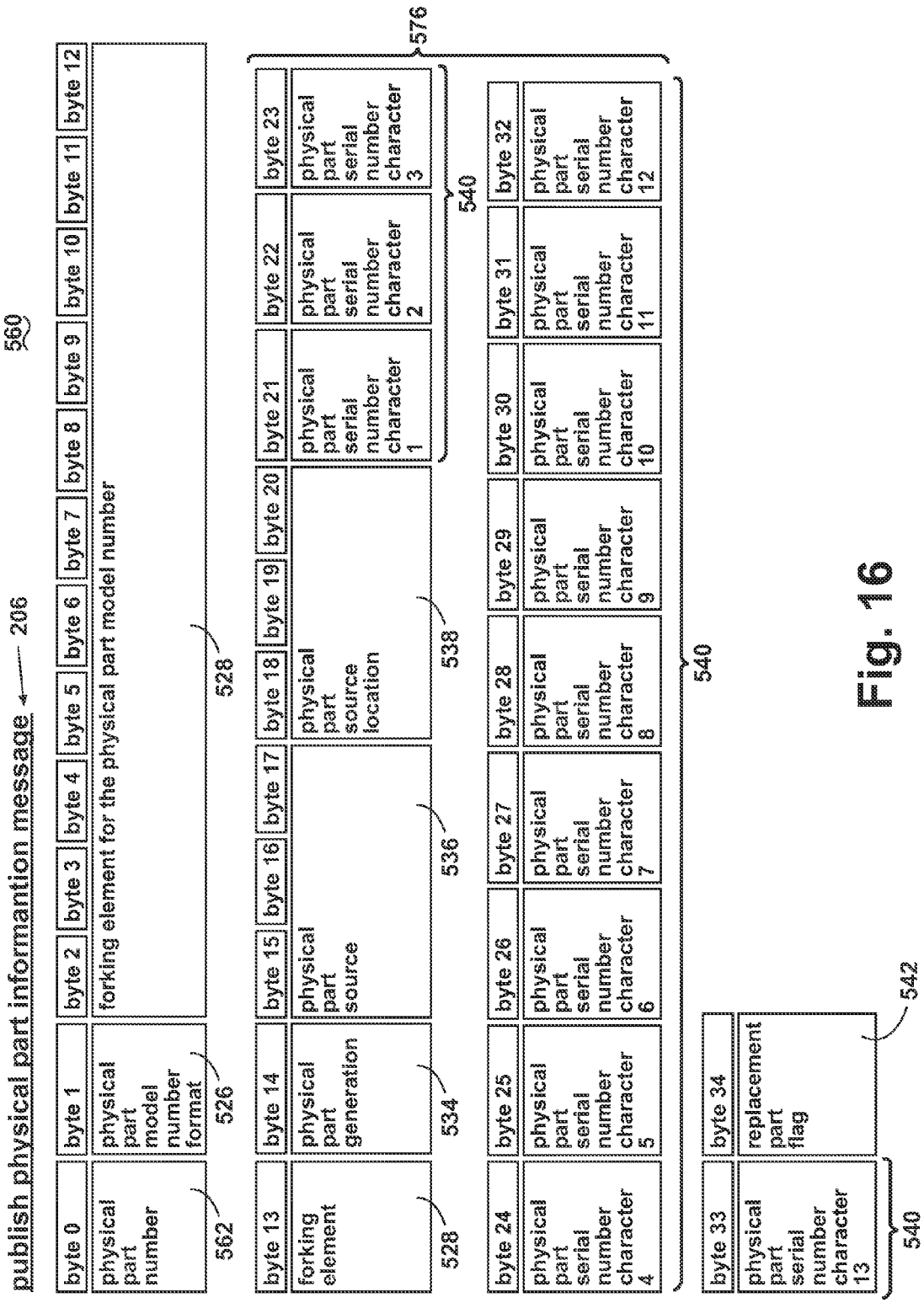
FIG. 16 schematically illustrates a publish physical part information message in a message architecture according to the invention.

Turning to FIG. 16, an example byte map 560 is shown corresponding to the publish physical part information message 206 discussed with respect to FIG. 10. It will be understood that the thirty-four byte map 560 shown in FIG. 16 corresponds to a compilation of the byte maps 524 and 533 discussed with respect to FIGS. 12-14. The byte map 533 is appended to the byte map 524 to form the byte map 560 discussed with respect to FIG. 16, FIGS. 12-14 thus have a common structure with respect to that shown in FIGS. 16 and 17, and, therefore, like elements are referred to with common reference numbers between FIGS. 12-14 and FIGS. 16-17.

Therefore, it will be apparent that FIG. 16 comprises a first identifier 562 relating to an identifier of the physical part number, which is the index or current value of the loop count corresponding to the physical part from 1 to i, a second identifier 526 corresponding to a particular physical part number format, a third identifier 528 having a format corresponding to the second identifier comprising a series of bytes representing the physical part model number such as that example discussed with respect to FIG. 13, a fourth identifier 534 relating to the physical part generation or revision information. Additional identifiers include an identifier of a physical part source 536, an identifier for the physical part source location 536 and, a series of bytes relating to the physical part serial number 540, and finally terminating with the replacement part flag 542 discussed with respect to FIG. 14.

Figure 17:
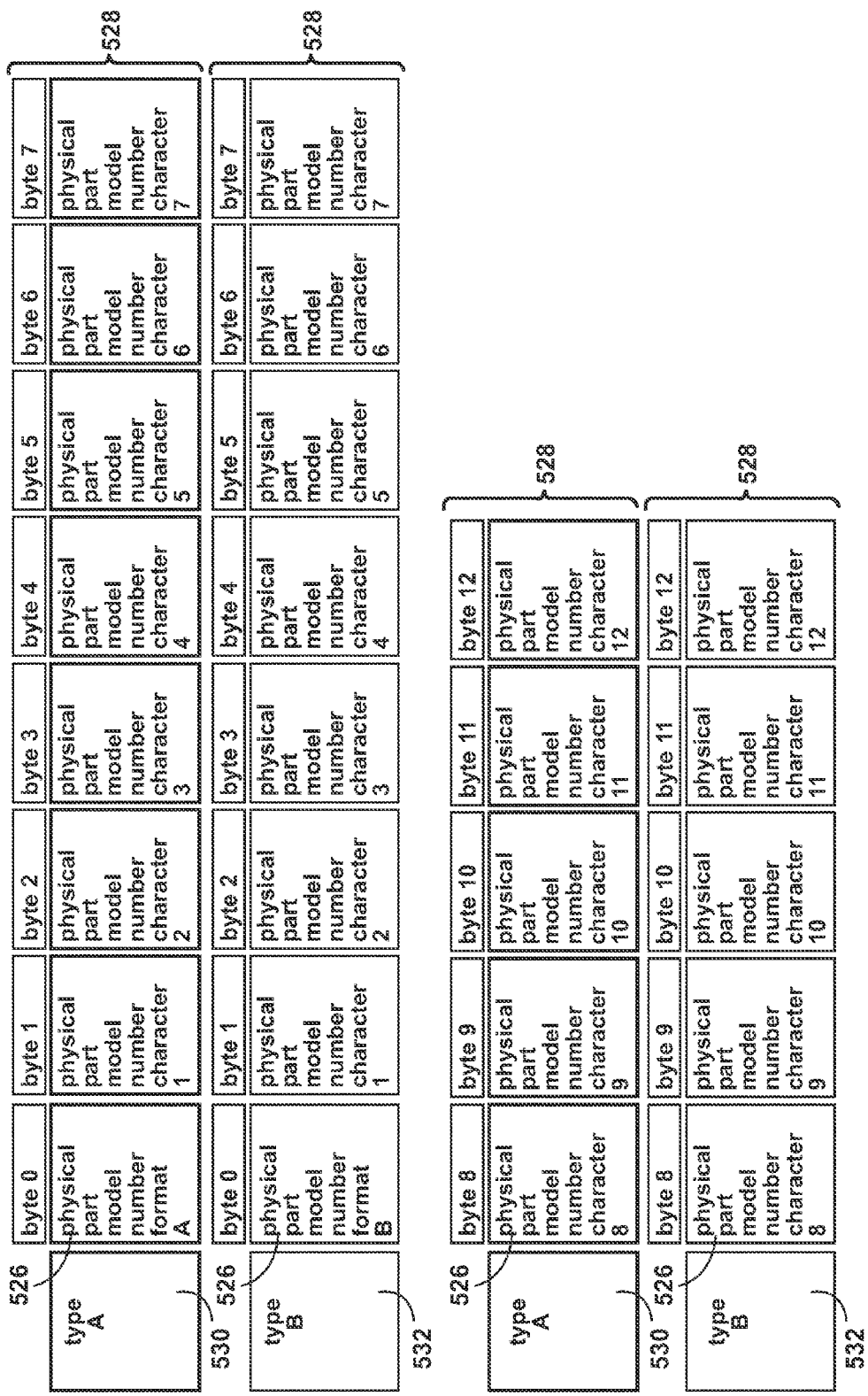
FIG. 17 schematically illustrates exemplary forking elements in the second identifier of FIG. 16.

An example of the forking element for the physical part model number 528 discussed with respect to the byte map 560 in FIG. 16, is shown in FIG. 17 with reference numerals 530 and 532 as a physical part model number format types A and B, respectively. It can be seen that the example forking element for the physical part model number shown in FIG. 17 is similar in nature to the forking element for the physical part model number shown by example in FIG. 13 and the detailed description of which applies equally here and is not set forth again.

Figure 18:
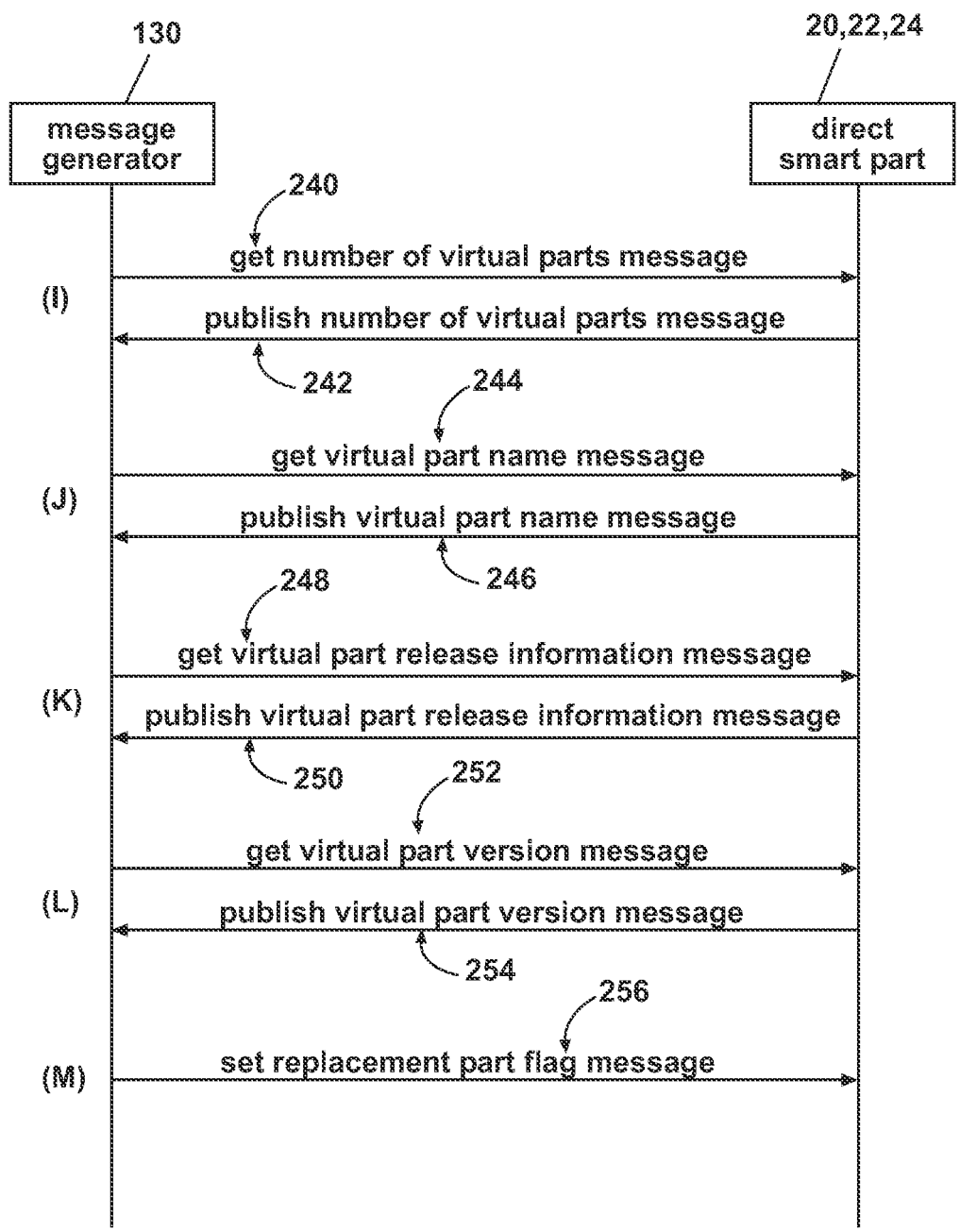
FIG. 18 schematically illustrates a series of messages between a message generator and a direct smart part in a manner similar to that of FIGS. 3 and 10.

Turning now to FIG. 18, the collaboration or exchange by message between a message generator 130 and direct smart part 20, 22, 24 are shown by example where I, J, K, L and M correspond to typical message exchanges or request-response message pairs. It will be understood that additional or fewer commands can be provided between the message generator 130 and the smart part 20, 22, 24 without departing from the scope of this invention. The description of the operation of the message architecture set forth in FIG. 18 is generally the same as that described with respect to FIGS. 3 and 10 and a commensurate description is not provided again here. In the example shown in FIG. 18, a get number of virtual parts message 240 is responded to with a publish number of virtual parts message 242, a get virtual part name message 244 is responded to with a publish virtual part name message 246, a get virtual part release information message 248 is responded to with a publish virtual part release information message 250, a get virtual part version message 252 is replied to with a publish virtual part version message 254, and an optional set replacement part flag message 256 is shown being issued to the smart part 20, 22, 24. It will be noted that, contrary to the description provided with FIGS. 3 and 10, each of the get and set commands 240, 244, 248, and 252 are replied to with a corresponding unique publish message 242, 246, 250, and 254, respectively. Although these publish responses 242, 246, 250, and 254 are shown by example, it will be understood that common-byte-length publish events can be provided for each of the messages without departing from the scope of this invention and a particular message content could simply be defined by a particular byte or flag associated with the set, get or publish response. It will also be understood that the set command 256 can simply be a one-way issued command without a corresponding publish command, or a publish command showing the set value of the replacement part flag could also be provided without departing from the scope of this invention. Additionally, publish messages 242, 246, 250, and 254 could be combined into a single informational message.

Figure 19:
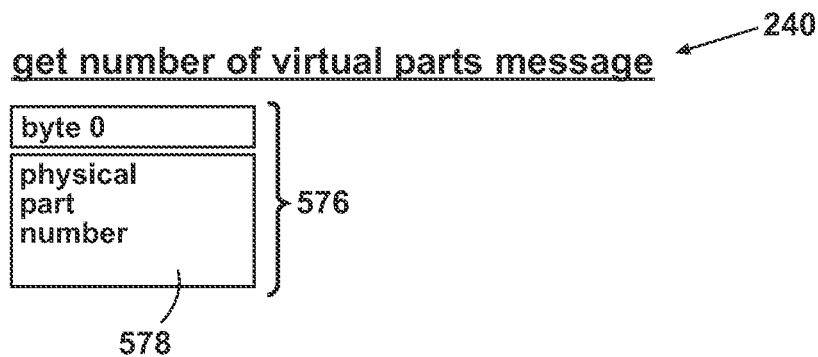
FIG. 19 schematically illustrates a get number of virtual parts message in a message architecture according to the invention.

Turning to FIG. 19, an example byte map 576 for the get number of virtual parts message 240 discussed with respect to FIG. 18 is shown. While the discussion of FIGS. 10-17 related to various modules for setting, getting and publishing various data regarding physical parts, such as hardware and/or circuit boards contained within the appliance, the discussion of FIGS. 18-28A relates to attaining information regarding "virtual" parts within an appliance network such as software modules, data modules, and the like. These software modules and data modules are referred to herein as virtual parts in connection with the description for this application.

In the get number of virtual parts message 240 shown in FIG. 19, the only argument is an identifier 578 which contains a physical part number to which the virtual parts are to be reported. Referring again to the previous description of the physical part number, the value of identifier 578 corresponds to the index or current value of the loop count corresponding to the physical part 1 to i and is used in the same manner for and for the same reasons in the messages of FIG. 20-28. This command allows a physical part to report multiple virtual parts based upon the identifier 578 provided in the byte map 576 for the get number of virtual parts message 240 shown in FIG. 19. This command can be useful for physical parts with more than one microprocessor, EEPROM, or other non-volatile memory. The identifier 578 is an argument for the get number of virtual parts message 240 allowing a single controller or smart part to act as a gateway for reporting other physical/virtual part information and other physical/virtual part information associated with other interconnected physical parts. This technique can cross multiple platforms and cover multiple physical parts whether connected directly or indirectly to the main appliance bus/internal network 14.

Figure 20:
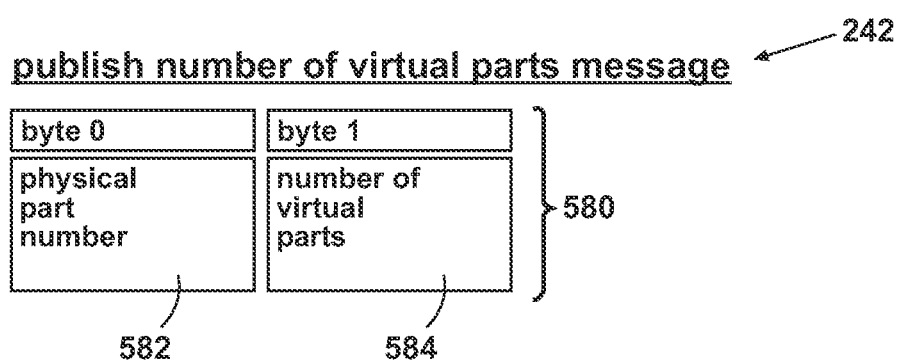
FIG. 20 schematically illustrates a publish number of virtual parts message in a message architecture according to the invention.

In response to the get number of virtual parts message 240 as discussed with respect to FIG. 19, a publish number of virtual parts message 242 is shown in FIG. 20. Byte map 580 has a first identifier 582 corresponding to the physical part number (the same identifier as the first identifier 578 set forth in FIG. 19) and a second identifier 584 comprising the response data corresponding to the number of virtual parts reported by the physical part having the physical part number identified by the first identifier 582. The number of virtual parts second identifier 584 contains a number of virtual parts associated with the physical part identified by the physical part number first identifier 582 discussed with respect to FIGS. 19-20. This message is preferably sent any time the number of virtual projects on a physical part, such as a controller, changes or when any of the data about an existing virtual part (such as revisions, part numbers etc.) changes or in response to message 240. It will be understood that the physical and virtual parts can be treated identically in this manner with the physical parts responding to the get, set and publish modules discussed with respect to FIGS. 10-17 and the virtual parts responding to the get, set and publish modules discussed with respect to FIGS. 18-28A.

Figure 21:
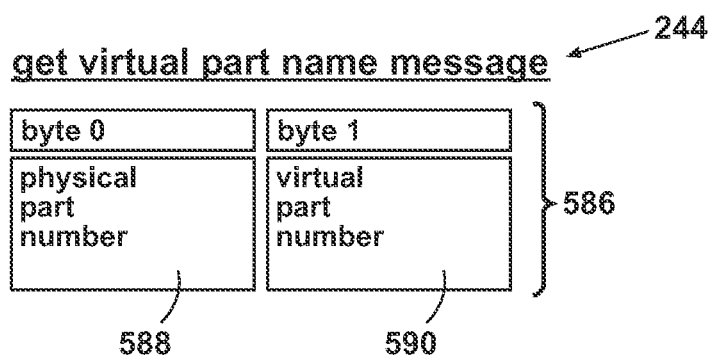
FIG. 21 schematically illustrates a get virtual part name message in a message architecture according to the invention.

Turning to FIG. 21, a description of the get virtual part name message 244 is shown comprising a byte map 586 having first identifier 588 corresponding to a physical part number and a second identifier 590 corresponding to a virtual part number. As previously discussed, both identifiers 588 and 590 are index counters, each from one of two nested loops where the first identifier corresponds to the index or current count value of the outer (first) loop and the second identifier corresponds to the index or current count of the inner (second) loop. Essentially, the byte map 586 allows the get virtual part name message 244 to provide a physical part identifier as the first identifier 588 and a virtual part identifier as the second identifier 590 issued to the particular physical part identified by the first identifier 588 to return information regarding the virtual part number as shown by the second identifier 590. The get virtual part name message 244 is useful since often virtual part names are assigned at the creation of a virtual part and can be used as an identifier in a source code integrity system even though a virtual part such as a software module eventually receives a product part number the project name can be helpful for reference back to a particular source code version, or build number to accurately identify the virtual part.

Figure 22:
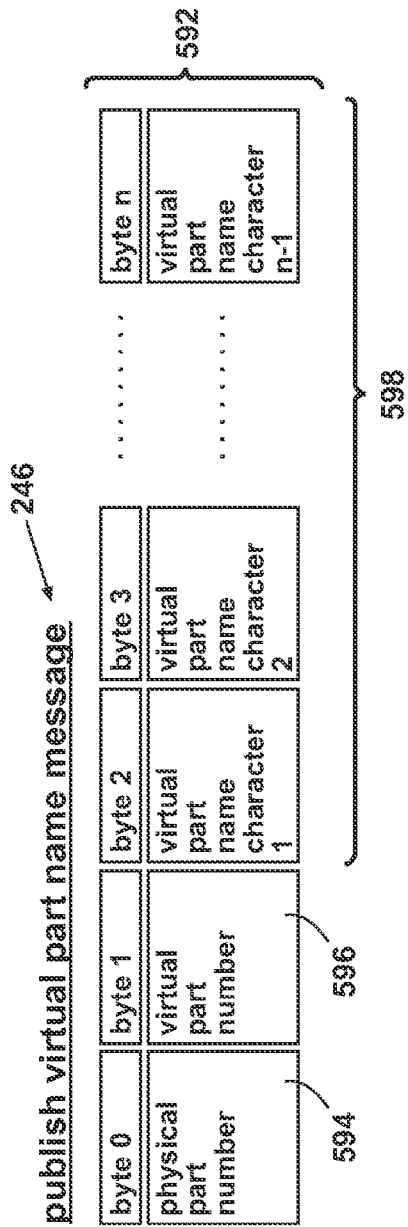
FIG. 22 schematically illustrates a publish virtual part name message in a message architecture according to the invention.

Turning to FIG. 22, the publish virtual part name message 246 is shown comprising a byte map 592 comprising a first identifier 594 which corresponds to the first identifier 588 in the get virtual part name message 244 and a virtual part number identifier 596 which corresponds to the virtual part number or identifier 590 discussed with respect to FIG. 21. In addition to the first and second identifiers 594 and 596, FIG. 22 discloses an additional identifier 598 which sets forth a one-to-n series of bytes which make up an identifier of the virtual part name that the publish virtual part name message 246 provides in response to the get virtual part name message 244 discussed with respect to FIG. 21. This allows any node, diagnostic tool, or servicer to obtain information regarding a particular virtual part by issuing the get virtual part name message 244 and receiving in response the publish virtual part name message 246 described with respect to FIG. 22.

Figure 23:
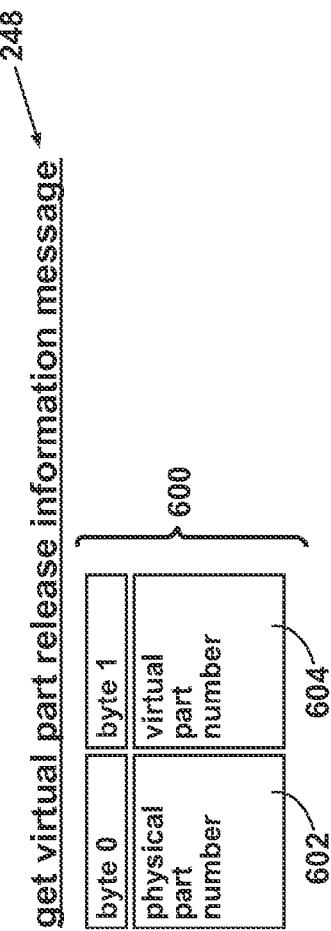
FIG. 23 schematically illustrates a get virtual part release information message in a message architecture according to the invention.
Figure 24:
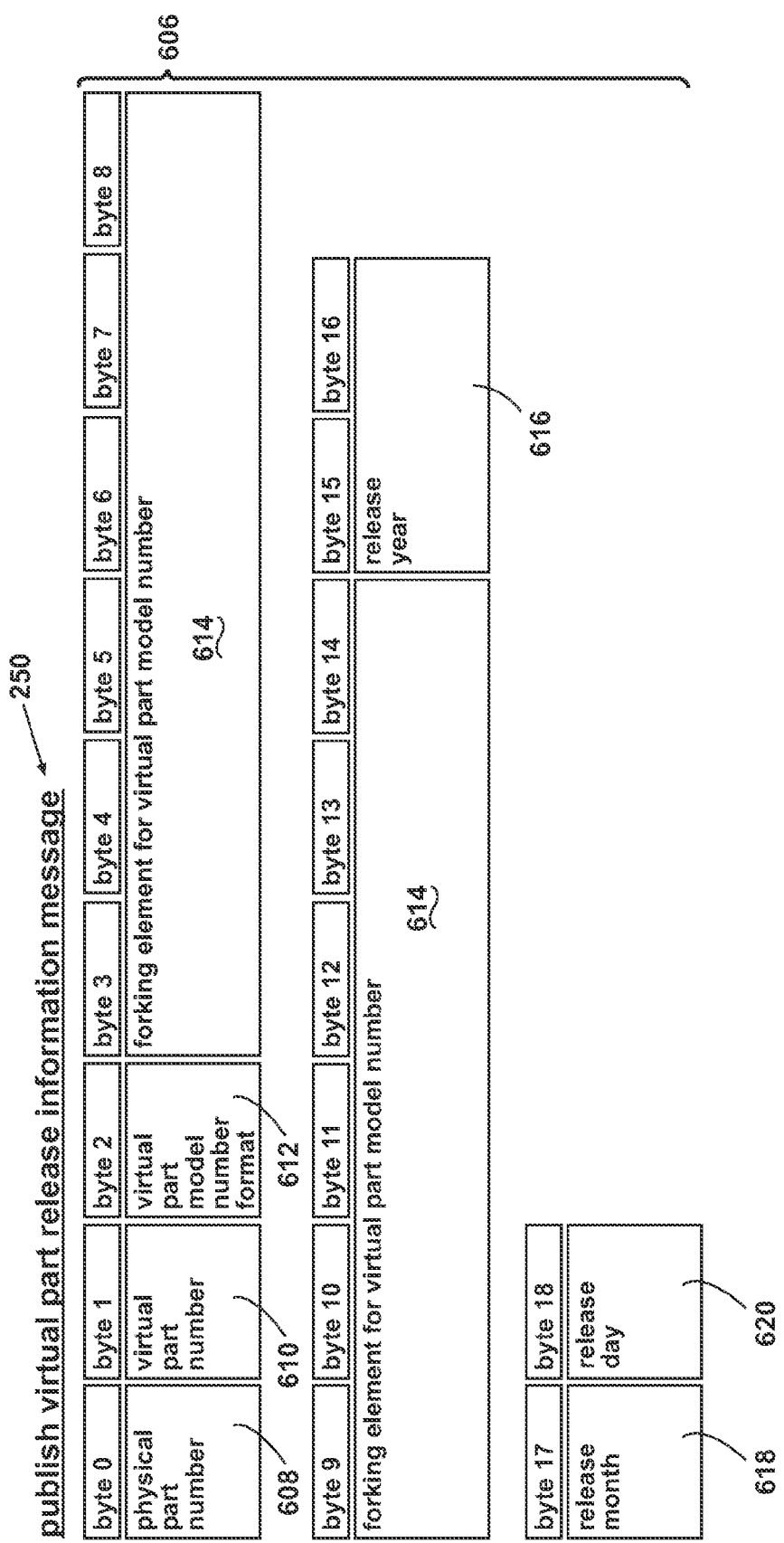
FIG. 24 schematically illustrates a publish virtual part release information message in a message architecture according to the invention.

In addition to the virtual part name message described with respect to the get and publish virtual part name messages 244, 246 in FIGS. 21-22, the invention also contemplates the issuance of the get virtual part release information message 248 shown with respect to FIG. 23 and receiving in response a publish virtual part release information message 250 shown with respect to FIG. 24. Turning to FIG. 23, the get virtual part release information message 248 is shown comprising a byte map 600 having a physical part number first identifier 602 and a virtual part number second identifier 604 thereon. The physical part number first identifier 602 and the virtual part number second identifier 604 correspond to the physical part number identifiers 578, 582, 588 and 594 and the virtual part number 604 corresponds to the virtual part number 590 and 596, respectively, discussed with respect to FIGS. 19-22. With the first identifier 602 and the second identifier 604, the get virtual part release information message 248 can pass an argument identifying a particular physical part, i.e., a hardware component or controller, and a particular virtual part, i.e., a software module or data module, located on that particular physical part.

In response to the get virtual part release information message 248 discussed with respect to FIG. 23, the publish virtual part release information message 250 is issued and is discussed in this application with respect to FIG. 24. FIG. 24 shows the publish virtual part release information message 250 comprising a byte map 606 having a first identifier 608 and a second identifier 610 wherein the first identifier 608 corresponds in reflection to the physical part number identifier 602 and the second identifier 610 corresponds to the virtual part number second identifier 604 passed by the get virtual part release information message 248.

The remainder of the byte map 606 following the first and second identifier 608 and 610 comprises an additional identifier 612 relating to a virtual part model number format enumerator. The virtual part number model number format enumerator 612 relates to a forking element 614 identifier which comprises a series of bytes to identify a particular virtual part model number based upon the data provided by the virtual part model number format enumerator 612. The forking element for the virtual part model number 614 can comprise a series of bytes, or byte shown in the example of FIG. 24, followed by a pair of bytes comprising an identifier 616 which contains the year of release for the virtual part number and, again, followed sequentially by a series of bytes 618 and 620 which correspond respectively to the month of release and day of release of the particular virtual part provided in the publish virtual part release information message 250 described with respect to FIG. 24.

Figure 25:
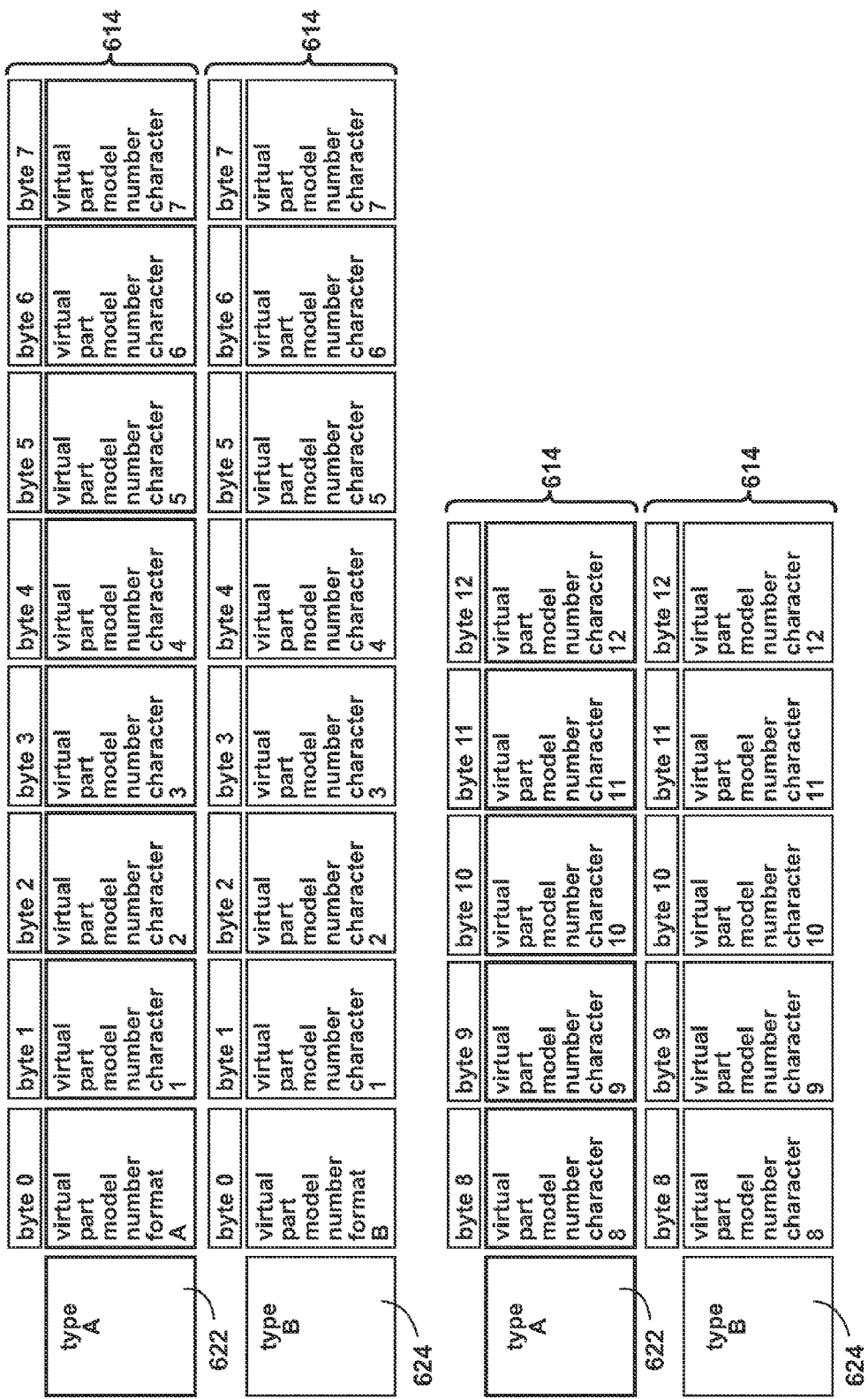
FIG. 25 schematically illustrates exemplary forking elements in the second identifier of FIG. 24.

An example of the forking element 614 shown in FIG. 24 with respect to the virtual part number model number format is shown by example in FIG. 25 for two different types of virtual part model number formats: type A shown with reference numeral 622 and type B shown with reference numeral 624, respectively. It will be understood that the virtual part model number format type A 622 and type B 624 can be any number of bytes corresponding to, or different than, the twelve bytes shown by example in FIG. 25 with byte zero being the enumerator to identify the particular virtual part model number format. This example in FIG. 25 is similar to the forking elements described with respect to previous drawings and will not be described in greater detail here.

Figure 26:
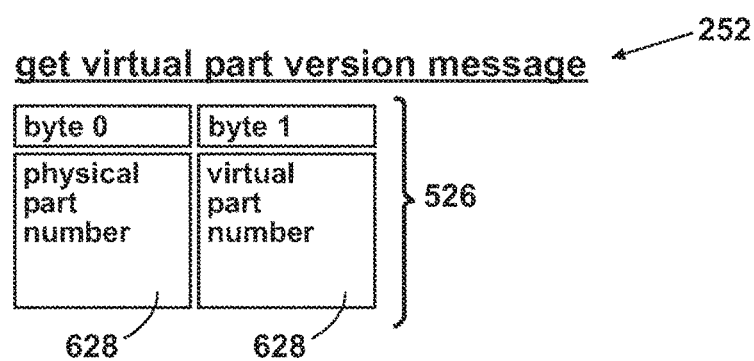
FIG. 26 schematically illustrates a get virtual part version information message in a message architecture according to the invention.

Turning to FIG. 26, an example byte map 626 is provided for the get virtual part version message 252 discussed with respect to FIG. 18. In the byte map 626 shown in FIG. 26, a first identifier corresponding to the physical part number is provided and shown with reference numeral 628 and a second identifier 630 is provided which corresponds to the particular virtual part number desired to obtain the virtual part version message 252 for the physical part corresponding to the first identifier 628. This message is useful to obtain the particular virtual part version that is installed on a particular physical part using the get virtual part version message 252.

Figure 27:
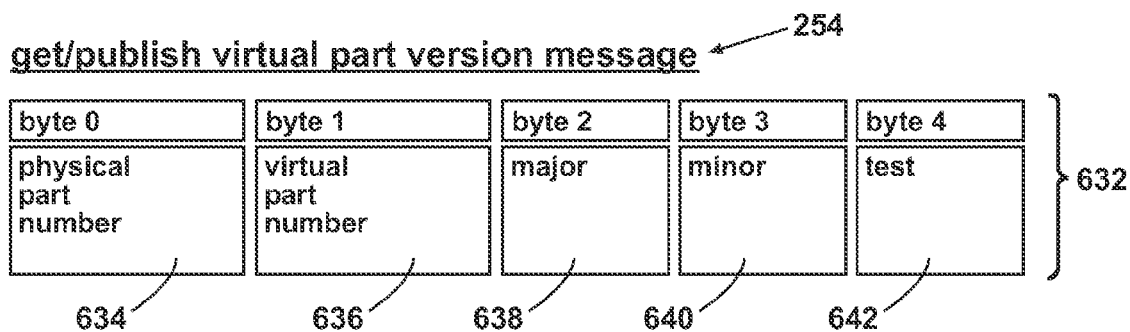
FIG. 27 schematically illustrates a publish virtual part version information message in a message architecture according to the invention.

In response to the get virtual part version message 252, a publish virtual part version message 254 is provided in response and discussed with respect to FIG. 27. FIG. 27 shows a byte map 632 which has a first identifier 634 and a second identifier 636 corresponding in reflection to the first and second identifiers 628 and 630 which were passed by the get virtual part version message 252 and discussed with respect to FIG. 26.

In FIG. 27, the byte map 632 has a series of bytes following the first and second identifiers 634 and 636 which correspond to exemplary and illustrative information regarding the virtual part version information published by the publish virtual part version message 254. In the example shown in FIG. 27, three examples of informational bytes are provided having reference numerals 638, 640 and 642 which correspond to major, minor and test version numbers for the particular virtual part identified by virtual part number 636 on physical part corresponding to identifier 634.

It will be understood that while three bytes are shown for the major, minor and test part version information 638, 640 and 642, additional or fewer version number information can be provided without departing from the scope of this invention. It would be understood that the publish virtual part version message 254 is in response to the get virtual part version message 252 and contains version information about the particular virtual part on a given physical part. For example the major, minor and test version number information 638, 640 and 642 could correspond to normal software version numbering conventions such as 0.0.0, 0.1.0, 0.2.3 etc. In addition, checkpointing and other file naming conventions can also be used without departing from the scope of this invention. Preferably, the version numbers can range from zero to some maximum number such as 999. As is well known for version information on software development, whenever normal versions of the software is distributed, that an increase in the major version number typically causes a reversion in the minor and/or test numbers back to zero and those begin incrementally again.

In any event, the particular numbering system for virtual part versions would be apparent to one skilled in the art, and different or alternative virtual part version numbering schemes should not be interpreted as being limiting on the scope of this invention. In any case, the messaging exchanges and associated information regarding virtual parts described in FIG. 18-27 would allow for the complete traceability of virtual parts back to a virtual part repository such as a version integrity system.

Figure 28:
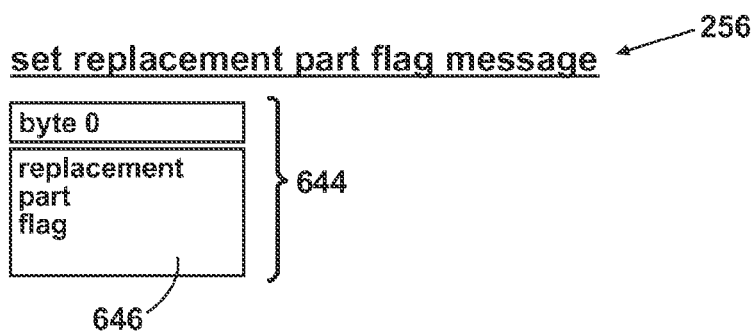
FIG. 28 schematically illustrates a set replacement part flag message in a message architecture according to the invention.

Turning to FIG. 28, the set replacement part flag message 256 is discussed with respect to FIG. 28 and has been discussed with previous figures as well. The example byte map 644 shown in FIG. 28 for the replacement part flag message 256 comprises a single identifier 646 which preferably contains a Boolean value for the replacement part flag as shown in FIG. 28. When true, the particular physical part to which the set replacement part flag message 256 is sent indicates that the particular physical part is indeed a replacement part and appropriate modifications to warranty provisions and the like can be made by the accessory 16 to account for potential of unauthorized parts being installed on the appliance. Alternatively, when false, the replacement part flag indicates that the particular physical part installed within the appliance network is an original equipment component and considerations can be made to warranty provisions and the like based upon the original equipment store meaning in the appliance. In another possible embodiment not shown herein, byte map 644 could further include an additional byte containing physical part number so that indirect parts could have their replacement part flag set or reset by message.

Figure 28A:
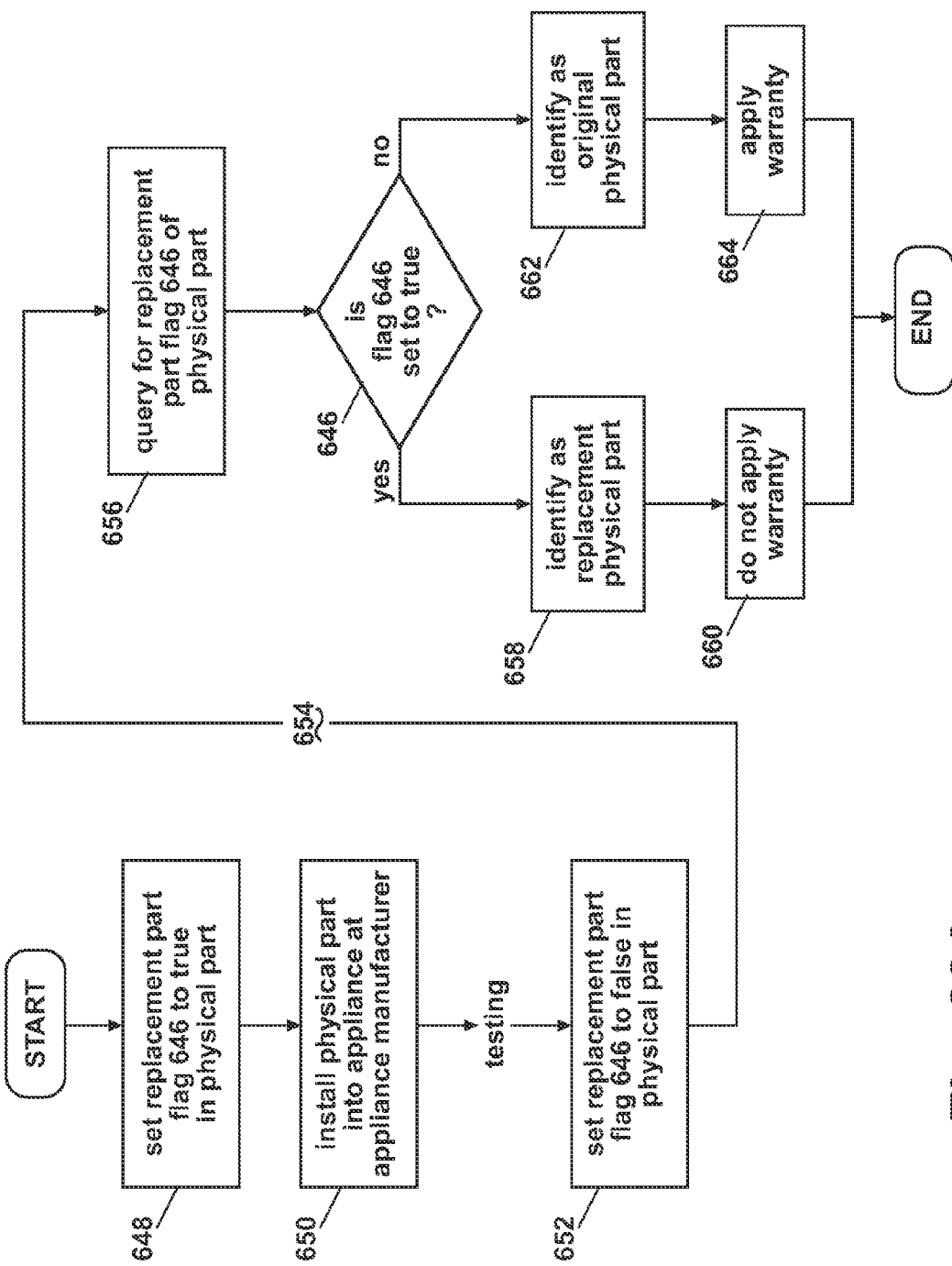
FIG. 28A illustrates an example method of the use of the replacement part flag in the message of FIG. 28.

FIG. 28A shows an example method of the use of the replacement part flag 646 shown with respect to the set replacement part flag message 256 in FIG. 28. In FIG. 28A, the physical part replacement part flag 646 is set to true at step 648 in FIG. 28A. At step 650, the particular physical part, still with its replacement part flag set to true is installed into an appliance at an original equipment location. At step 652, at the end of a factory line testing procedure, the replacement part flag is set to false using the set replacement part flag message 256 described with respect to FIGS. 18 and 28. At this point the newly-manufactured appliance leaves the factory with the set replacement part flag message set to false for any suitable physical parts within the appliance, indicating that the physical parts are indeed original equipment components leaving the factory in a new appliance. Then a break is shown at step 654 at which point the lifecycle of the appliance is unknown until a servicing event in the field occurs which is shown by step 656. A diagnostic tool or servicer in the form of accessory 16 can make a query to get the replacement part flag message for the various physical parts within the appliance and determine if the replacement flag message is true. This query can comprise a message generator 130 of the accessory 16 issuing the get physical part information message 210. If so, then the particular physical part being queried is determined to be a replacement part and appropriate warranty considerations can be made. All this is shown at step 658 and 660 in FIG. 28A. Alternatively, if the replacement part flag message is set to false at step 662 indicating that the replacement part flag has not been changed since its manufacture and setting to false at the factory at step 652, the diagnostic tool or servicer in the form of accessory 16 may understand that the part is still an OEM part, such as that shown at 664, and make appropriate warranty repair considerations based upon this information.

Diagnosis and Servicing an Appliance

Figure 30:
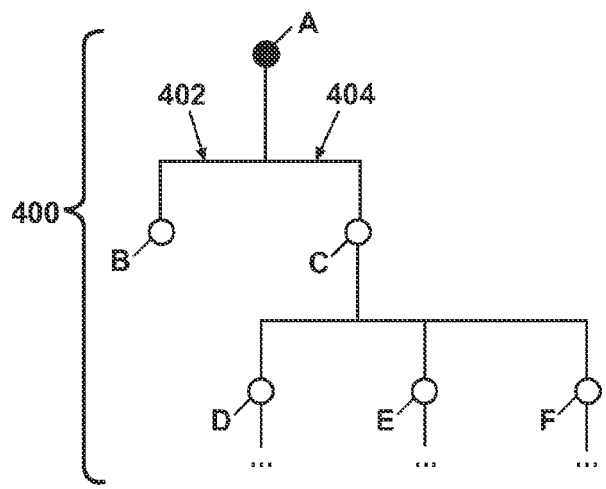
FIG. 30 schematically illustrates a fault tree used in the method of FIG. 29.

The foregoing messaging protocol and message architecture can be effectively used to diagnose and service an appliance. Appliances are often diagnosed and serviced using a fault tree. A typical fault tree 400 of the type contemplated by the present invention is shown in FIG. 30. The fault tree 400 is characterized by an ordered collection of steps with transitions between the steps. The initial step of an appliance fault tree will normally be associated with a symptom of failure in the appliance. Each step of a fault tree, including the initial step will have associated actions. Actions are things that should be done in the step. Exemplary actions include, but are not limited to, taking measurements, asking questions, requesting user input, describing observations and the like. Transitions will be paths to other steps that are normally conditional on the result of a given step. The exemplary fault tree 400 commences with an initial step A which might be associated with a particular symptom of the appliance. For example, if the symptom were "motor does not work", an initial step A might be "check to see if there is power to the motor."

The fault tree 400 might have two possible transitions 402, 404 from step A, each leading to another step B and C, respectively. Which transition occurs may depend on the outcome of step A. Continuing with the foregoing hypothetical, if the answer to step A is "no", then transition 402 will lead to step B which might be "see if the appliance is plugged in." If the appliance were not plugged in, but doing so actuates the motor, then step B results in a solution and the diagnosis is complete. If the answer to step A is "yes", then the transition 404 will lead to step C which might be "measure the voltage at the motor." The answer to step C may lead to several different steps D, E, or F via corresponding transitions. For example, Step D may be taken if there were no voltage, step C taken if the voltage is within a first specified range, and step D if the voltage is within a second specified range. Traversing the fault tree 400 will continue until all possible diagnoses are evaluated.

Figure 31:
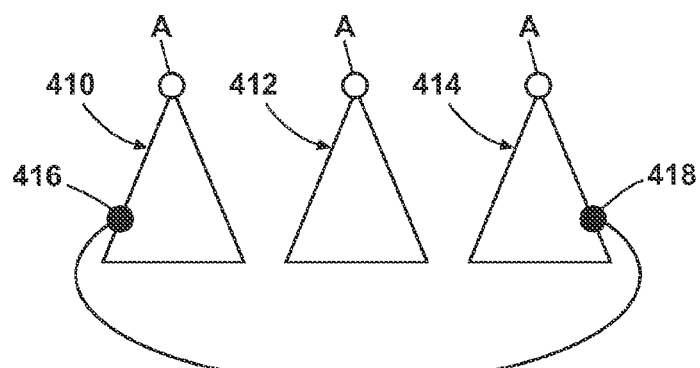
FIG. 31 schematically illustrates a plurality of fault trees used in the method of FIG. 29.

Looking now at FIG. 31, it may be that a given appliance will have more than one fault tree associated with it. For example, there may be a fault tree associated with different components or different subsystems in the appliance. Or there may be different fault trees associated with accessories connected to the appliance. In FIG. 31, there are three fault trees 410, 412, and 414. Each fault tree has an initial step A that would normally serve as the starting point for entry into the respective fault tree. It may be, and often is the case, that any given fault tree for an appliance might have multiple entry points. In FIG. 31, for example, there is a plurality of entry points, including the initial step A and a second initial step 416. Further, a transition is not limited to transitioning to a sequential step within the same fault tree. For example, a transition from step 416 on fault tree 410 may lead to step 418 on another fault tree 414.

Figure 32:
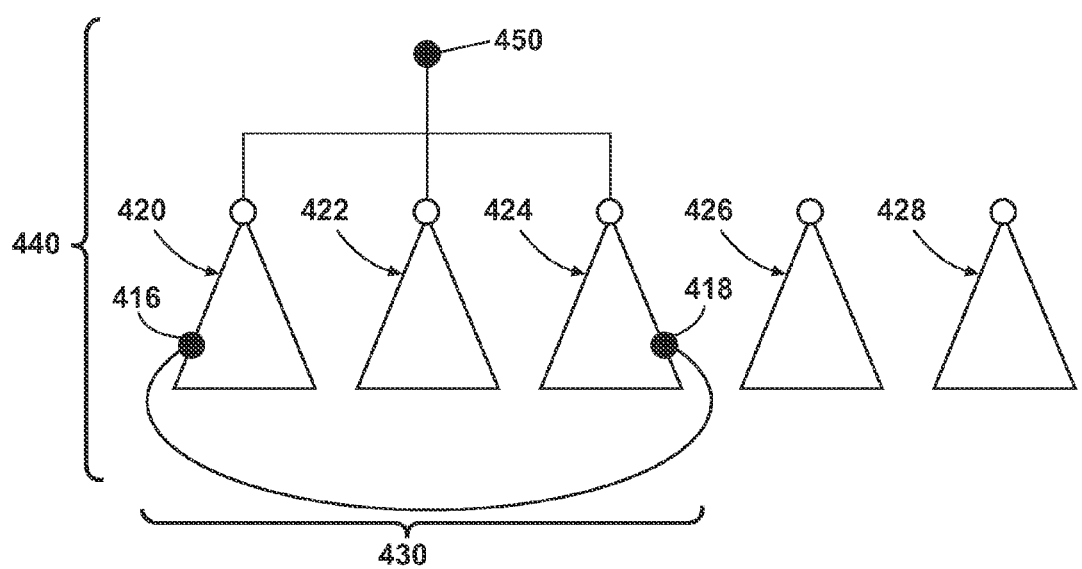
FIG. 32 schematically illustrates a customized fault tree aggregated in the method of FIG. 29.

Looking now at FIG. 32, one aspect of the invention is shown. Imagine a given appliance configured to perform a cycle of operation on an article. The appliance will typically have multiple components, and a number of fault trees 420, 422, 424, 426, 428 will have been established for diagnosing the appliance and its components. Assume further that the appliance has an internal communications network of the type described in FIG. 1 and is fully configured to use a suitable messaging capability such as the messaging protocol and message architecture described above. A system in communication with the appliance, and especially using the messaging protocol and message architecture described above, can obtain information about the components associated with the appliance. Based on that information, the system can select a subset 430 of the established fault trees and dynamically aggregate the subset to create a customized fault tree 440 having its own initial step 450.

The beauty of the messaging protocol and message architecture described above is that the information can be obtained knowing only the identifiers that are provided in a communication. Thus, information can include at least one identifier associated with a component. The identifier can represent, for example, a class, a type, or an instance of the component. He information can include such things as of serial number, model number, component information, manufacturer, supplier, location, cross reference, time of manufacture, date of manufacture, location of manufacture, a software module, a functionality identifier, replacement part, original part, and software module version, software version, attributes of a particular component, attributes of particular material used in a component, attributes of a component type, attributes of material type used in a component, information associating material or component with a 'lot' or batch, information associating material or components with time, a location, or cost, or replacement information, or any other information that can be included in the data modules 110 as described previously. It could also include error codes, fault codes, part identifiers, defects based on part identifiers, and user descriptions and terms derived from user descriptions.

In the latter case, response to user inquires can be inputted to the system via a user interface in the appliance or in an accessory coupled to the appliance. In some case, surveying a user to obtain information about components associated with the appliance can be become an important step in a method of customizing a fault tree for an appliance Thus, the method of customization of a fault tree for an appliance can be conducted in a service accessory connected to the appliance, such as the service accessory 16 of FIG. 1.

An acceptable service accessory can include such things as a PC, a local data collector, or a central data collector. Of course, as discussed with respect to FIG. 1, the appliance can be the component or it can comprise at least one component.

It will be understood that the foregoing method can result in a plurality of customized fault trees for a number of different appliances. Applying the same method can include selecting one fault tree from the plurality. In this way, a given appliance can then be diagnosed and/or serviced using the selected fault tree.

Both FIGS. 31 and 32 illustrate a second aspect of the invention. In both figures, it will be apparent that steps 416, 418 are not at the top of their respective fault trees, and therefore are not the first initial step where one would ordinarily commence traversal of the fault tree. According to the second aspect of the invention, the time for diagnosis of an appliance can be expedited if a best or optimal initial step can be ascertained so that the fault tree need not always be commenced at the top.

Looking now at FIG. 29, a method 300 of accomplishing both the first and second aspects of the invention is illustrated. In other words, an appliance can be diagnosed and perhaps serviced, based on information gleaned from the appliance and its components. The method commences with some fault 302 occurring in a given appliance. It is assumed that the appliance is configured to communicate by electronic message, and preferably using the messaging protocol and message architecture described above. Information about the components associated with the appliance is obtained via electronic messages at 304. Symptoms of the fault are identified at 306. Symptoms can be identified from an error code such as an identifier in a special network message or stored in memory, or a fault code as a displayed message with an identifier. Error codes and fault codes represent faults that occur in the appliance and can be automatically generated or initiated by any suitable means and communicated over the appliance network. Error codes are often considered a subset of fault codes and are often unique to a given appliance. Multiple error codes can be associated with a single fault code. Error codes and fault codes are sometime displayed on a user interface, as well as communicated over the appliance network. Symptoms can also be identified from user input. In this case, the selection, biasing aggregation, and/or customization of the fault tree(s) can be accomplished by software configured to accept raw user input via voice or text and resolve that input to a set of known symptoms, which is then used to select, bias, aggregate, and/or customize the fault tree(s) Any sort of defect as a function of a component identifier can also be a symptom. For example, a known defect stored in a database associated with a given identifier might be a symptom for purposes of a fault tree analysis. Regardless of how symptoms are identified, the symptoms or information used to ascertain symptoms can be part of the information about the components that is communicated from the appliance.

In one example, a batch of bad resistors was used in the manufacturing of a particular type of smart part for a one-week period in two different manufacturing locations. The particular type of smart part manufactured with the bad resistors during this time also has three associated physical part model numbers. Once this information is known and stored in a database, one of ordinary skill in the art can understand how the messaging protocol and message architecture can be used to provide the necessary identification capabilities and information to query the database to find out if an appliance having this particular type of smart part has one of the smart parts with bad resistors. For example, the physical part model number of the smart part in the appliance can be compared to the three physical part model numbers in the database associated with the bad resistor smart parts. With this type of informational continuity and traceability, the time to ascertain the root cause of a problem or fault can be greatly diminished when compared to a manual process of physical teardown and component/subcomponent manual inspection.

Once a symptom is identified, one of two steps will occur. At 308 a relevant fault tree associated with the appliance and/or the components will be identified, or a plurality of relevant fault trees will be identified at 309. Once a relevant fault tree is established at 308, and based on the information about the components, including the symptoms, the best or most optimal initial step in the fault tree is ascertained at 310. In other words, the method biases the entry point in the fault tree based on the information.

If, on the other hand, a plurality of relevant fault trees is identified at 309, the best or most optimal subset of fault trees based on the information about the components, including the symptoms, is selected at 311. The subset is then dynamically aggregated to create a customized fault tree at 312, preferably with an optimal initial step determined for the entry point as apart of the aggregation.

Once the optimal initial step is determined, the method commences traversing the fault tree by following the ordered collection of steps from the initial step at 314. It will be understood that with a biased entry point into a known fault tree, following the steps to a solution can be expedited without having to traverse the entire fault tree. Similarly, customizing a fault tree according to the method can result in fewer steps that can likewise result in expedited diagnosis. Typically, each step will be associated with a query at 316 of whether the step resulted in a solution. If the answer is "no" then a transition at 318 directs the traversal to another step, which can be a next step 320 in the same fault tree, or a new entry point 322 in the same fault tree, or a new entry point in a different fault tree 324. The subsequent step, wherever it may occur, will typically result in another query 326 about solution. The process continues until a solution is achieved.

While the invention has been specifically described in connection with certain specific embodiments thereof, it is to be understood that this is by way of illustration and not of limitation, and the scope of the appended claims should be construed as broadly as the prior art will permit.

What is claimed is:

1. An appliance having at least two components and an internal communications network, where a first one of the at least two components is in communication with the network and a second one of the at least two components is not in communication with the network or the first one of the at least two components, wherein the first one of the at least two components is configured to communicate service information related to the second one of the at least two components over the internal communications network, the second one of the at least two components is a subcomponent of the first one of the at least two components, and the first one of the at least two components is responsive in subsequent messages to queries about each of the subcomponents counted in a count loop based on a number of subcomponents, and based on an index correlating to the count loop whereby an inquirer can obtain information about a subcomponent knowing only an index parameter associated with the subcomponent.

2. The appliance of claim 1 wherein the service information includes at least one identifier.

3. The appliance of claim 1 wherein the first one of the at least two components is configured to communicate a number of the second one of the at least two components for which it is configured to communicate service information.

4. The appliance of claim 1 wherein the first one of the at least two components is responsive in subsequent messages to queries about each of the second one of the at least two components counted in a count loop.

5. The appliance of claim 4 wherein the first one of the at least two components is responsive in further messages to queries based on an index correlating to the count loop whereby an inquirer can obtain information about a second one of the at least two components knowing only an index parameter associated with the second one of the at least two components.

6. The appliance of claim 5 wherein the first one of the at least two components is responsive in subsequent messages to queries about a number of subcomponents related to the second one of the at least two components.

7. The appliance of claim 6 wherein the first one of the at least two components is responsive in subsequent messages to queries about each of the subcomponents counted in a second count loop based on the number of subcomponents.

8. The appliance of claim 7 wherein the first one of the at least two components is responsive in further messages to queries based on a second index correlating to the second count loop whereby the inquirer can obtain information about a subcomponent knowing only an index parameter associated with the subcomponent.

9. The appliance of claim 1 wherein the information about a subcomponent is correlated to information about one of the first one of the at least two components and the second one of the at least two components.

10. The appliance of claim 1 wherein the first one of the at least two components communicates the service information to a client.

11. The appliance of claim 10 wherein the appliance has the service information and the service information includes one of serial number, model number, component information, manufacturer, supplier, location, cross reference, time of manufacture, date of manufacture, location of manufacture, a software module, a functionality identifier, replacement part, original part, and software module version, serial number, model number, part number, manufacturer, supplier, location, cross reference, time of manufacture, data of manufacture, place of manufacture, a software module, a functionality identifier, software version, attributes of a particular component, attributes of particular material used in a component, attributes of a component type, attributes of material type used in a component, information associating material or component with a 'lot' or batch, information associating material or components with time, a location, or cost, and replacement information.

12. The appliance of claim 1 wherein the first one of the at least two components communicates with the second one of the at least two components over a network other than the internal communications network.

13. The appliance of claim 10 wherein the service information related to the second one of the at least two components is stored in the first one of the at least two components.

14. The appliance of claim 10 wherein the service information related to the second one of the at least two components is in memory accessed by the first one of the at least two components.

15. The appliance of claim 1 wherein the second one of the at least two components is a virtual component.

16. The appliance of claim 15 wherein the virtual component includes one of a first software module for controlling a motor, a data module containing data parameters about the motor allowing the first software module to appropriately parameterize and configure itself for the control of the motor, a cycle engine for controlling a cycle of operation of an appliance, a data module containing a cycle structure for use by the cycle engine to control the cycle of operation, a data module containing data for use by a user interface engine to create screens, screen content, and a navigation between screens, a data module containing media content which can be used in communication with a user.

17. The appliance of claim 1 wherein the first one of the at least two components proxies for at least two second ones of the at least two components and communicates a number of second ones of the at least two components for which it proxies.

18. The appliance of claim 17 wherein the number of second ones of the at least two components for which the first one of the at least two components proxies is used in subsequent messages as an identifier.

19. The appliance of claim 1 wherein the second one of the at least two components is a subcomponent of the first one of the at least two components.

* * * * *